United States Patent
Jung et al.

(10) Patent No.: US 10,430,537 B2
(45) Date of Patent: Oct. 1, 2019

(54) INTEGRATED CIRCUIT INCLUDING CELLS/GATES ARRANGED BASED ON SUPPLY VOLTAGE VARIATIONS OF CELLS AND INFLUENCE BETWEEN CELLS, AND DESIGN METHOD THEREOF

(71) Applicant: Samsung Electronics Co., Ltd., Suwon-si, Gyeonggi-do (KR)

(72) Inventors: Jongyoon Jung, Seoul (KR); Andrew Paul Hoover, Austin, TX (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/968,979

(22) Filed: May 2, 2018

(65) Prior Publication Data

US 2018/0322233 A1 Nov. 8, 2018

(30) Foreign Application Priority Data

May 8, 2017 (KR) ......................... 10-2017-0057525

(51) Int. Cl.
*G06F 17/50* (2006.01)
*H01L 27/02* (2006.01)

(52) U.S. Cl.
CPC ...... *G06F 17/5031* (2013.01); *G06F 17/5045* (2013.01); *H01L 27/0207* (2013.01); *G06F 2217/78* (2013.01); *G06F 2217/84* (2013.01)

(58) Field of Classification Search
CPC ............. H01L 27/0207; G06F 17/5031; G06F 17/5045; G06F 2217/78; G06F 2217/84; H03K 19/00323
See application file for complete search history.

(56) References Cited

U.S. PATENT DOCUMENTS

| | | | | |
|---|---|---|---|---|
| 4,843,256 A | * | 6/1989 | Scade | ...................... G05F 3/205 |
| | | | | 257/299 |
| 4,849,702 A | * | 7/1989 | West | ................ G01R 31/31713 |
| | | | | 327/160 |
| 6,425,115 B1 | * | 7/2002 | Risler | .................... G06F 17/505 |
| | | | | 257/E27.108 |
| 7,171,641 B2 | | 1/2007 | Kurose et al. | |
| 7,562,266 B2 | | 7/2009 | Hosono | |
| 8,166,432 B2 | | 4/2012 | Kosugi | |
| 8,516,424 B2 | | 8/2013 | Tetelbaum et al. | |
| 8,656,331 B1 | | 2/2014 | Sundareswaran et al. | |

(Continued)

OTHER PUBLICATIONS

Kouroussis et al. "Voltage-Aware Static Timing Analysis" IEEE Transactions on Computer-Aided Design of Integrated Circuits and Systems 25(10):2156-2169 (Oct. 2006).

(Continued)

*Primary Examiner* — Andrew Q Tran
(74) *Attorney, Agent, or Firm* — Myers Bigel, P.A.

(57) ABSTRACT

According to an example embodiment, an integrated circuit may include a plurality of cells and a plurality of paths that supply power to the plurality of cells, respectively. The plurality of cells and the plurality of paths may be arranged based on a plurality of propagation delays of the plurality of cells, which include a plurality of first delays of the plurality of cells generated by a plurality of power resistances of the plurality of paths and a plurality of second delays of the plurality of cells generated based on a plurality of arrival timing windows that overlap each other.

20 Claims, 17 Drawing Sheets

(56) References Cited

U.S. PATENT DOCUMENTS

| | | |
|---|---|---|
| 9,141,753 B2 | 9/2015 | Rozen et al. |
| 2003/0212538 A1 | 11/2003 | Lin et al. |
| 2005/0257077 A1* | 11/2005 | Dutta ................ G01R 31/3004 |
| | | 713/340 |
| 2007/0094630 A1 | 4/2007 | Bhooshan |
| 2008/0129277 A1* | 6/2008 | Sugiyama ........... G06F 17/5031 |
| | | 324/76.11 |

OTHER PUBLICATIONS

Lin et al. "Full-chip vectorless dynamic power integrity analysis and verification against 100uV/100ps-resolution measurement" Proceedings of the IEEE 2004 Custom Integrated Circuits Conference (pp. 509-512) (Oct. 2004).

Nithin et al. "Dynamic voltage (IR) drop analysis and design closure: Issues and challenges" 2010 11th International Symposium on Quality Electronic Design (ISQED) (7 pages) (Mar. 2010).

Pant et al. "Static Timing Analysis Considering Power Supply Variations" IEEE/ACM ICCAD-2005 International Conference on Computer-Aided Design (pp. 365-372) (Nov. 2005).

Vishweshwara et al. "An Approach to Measure the Performance Impact of Dynamic Voltage Fluctuations Using Static Timing Analysis" 2009 22nd International Conference on VLSI Design (pp. 519-524) (Jan. 2009).

\* cited by examiner

INTEGRATED CIRCUIT INCLUDING CELLS/GATES ARRANGED BASED ON SUPPLY VOLTAGE VARIATIONS OF CELLS AND INFLUENCE BETWEEN CELLS, AND DESIGN METHOD THEREOF

CROSS-REFERENCE TO RELATED APPLICATIONS

This U.S. non-provisional patent application claims priority under 35 U.S.C. § 119 to Korean Patent Application No. 10-2017-0057525 filed May 8, 2017, in the Korean Intellectual Property Office, the entire contents of which are incorporated herein by reference.

BACKGROUND

Embodiments of the inventive concepts described herein relate to integrated circuits and design methods of the integrated circuits, and more particularly, relate to integrated circuits including cells arranged considering a supply voltage variation of cells and influence between the cells, and design methods of the integrated circuits.

A static timing analysis (STA) may be used when designing an integrated circuit such as a system on chip (SoC), an application specific integrated circuit (ASIC), a memory, or the like. The static timing analysis may include the process of calculating delays of cells in the integrated circuit and determining whether a timing violation (e.g., a setup timing violation or a hold timing violation of a flip-flop) may occur.

Due to process miniaturization, a width of a line in the integrated circuit may become narrow, and an operation voltage of the integrated circuit may decrease. Also, influence between cells in the integrated circuit may increase. A dynamic voltage variation that can occur due to influences between resistances of lines for transmitting power and/or due to influences between cells may have impacts on the operation of the integrated circuit which may reduce performance and/or yield.

SUMMARY

Embodiments of the inventive concepts provide integrated circuits including cells arranged considering a supply voltage variation of cells and influence between cells, and design methods of the integrated circuits.

According to an example embodiment, an integrated circuit may include a plurality of cells and a plurality of paths that supply power to the plurality of cells, respectively. The plurality of cells and the plurality of paths may be arranged based on a plurality of propagation delays of the plurality of cells, which include a plurality of first delays of the plurality of cells generated by a plurality of power resistances of the plurality of paths and a plurality of second delays of the plurality of cells generated based on a plurality of arrival timing windows that overlap each other.

According to an example embodiment, an integrated circuit includes a first cell of a plurality of cells and a second cell of the plurality of cells, where a location of the first cell within the integrated circuit is arranged according to a plurality of propagation delays of the first cell. The plurality of propagation delays may include a first delay of the first cell generated based on a plurality of power resistances of the first cell and a first switching operation of the first cell, and a second delay of the first cell generated based on a voltage variation due to a second switching operation of the second cell.

According to an example embodiment, a method of integrated circuit design may include extracting a plurality of power resistances of a plurality of paths for supplying power to a plurality of cells of an integrated circuit, calculating a plurality of first timing derates indicating a plurality of first delays of the plurality of cells generated by the plurality of power resistances, performing a first static timing analysis to calculate a plurality of propagation delays of the plurality of cells by using the plurality of first timing derates and to determine a plurality of arrival timing windows, in which the plurality of cells respectively receive input signals, by using the plurality of propagation delays, calculating a plurality of second timing derates indicating a plurality of second delays of the plurality of cells generated as the plurality of arrival timing windows overlap each other, performing a second static timing analysis to calculate the plurality of propagation delays by using the plurality of first timing derates and the plurality of second timing derates, and arranging the plurality of cells or the plurality of paths based on a result of the second static timing analysis.

BRIEF DESCRIPTION OF THE FIGURES

The above and other objects and features of the inventive concepts will become apparent by describing in detail example embodiments thereof with reference to the accompanying drawings.

DETAILED DESCRIPTION

Example embodiments of the inventive concepts will now be described more fully with reference to the accompanying drawings, in which example embodiments are shown.

Figure 1:
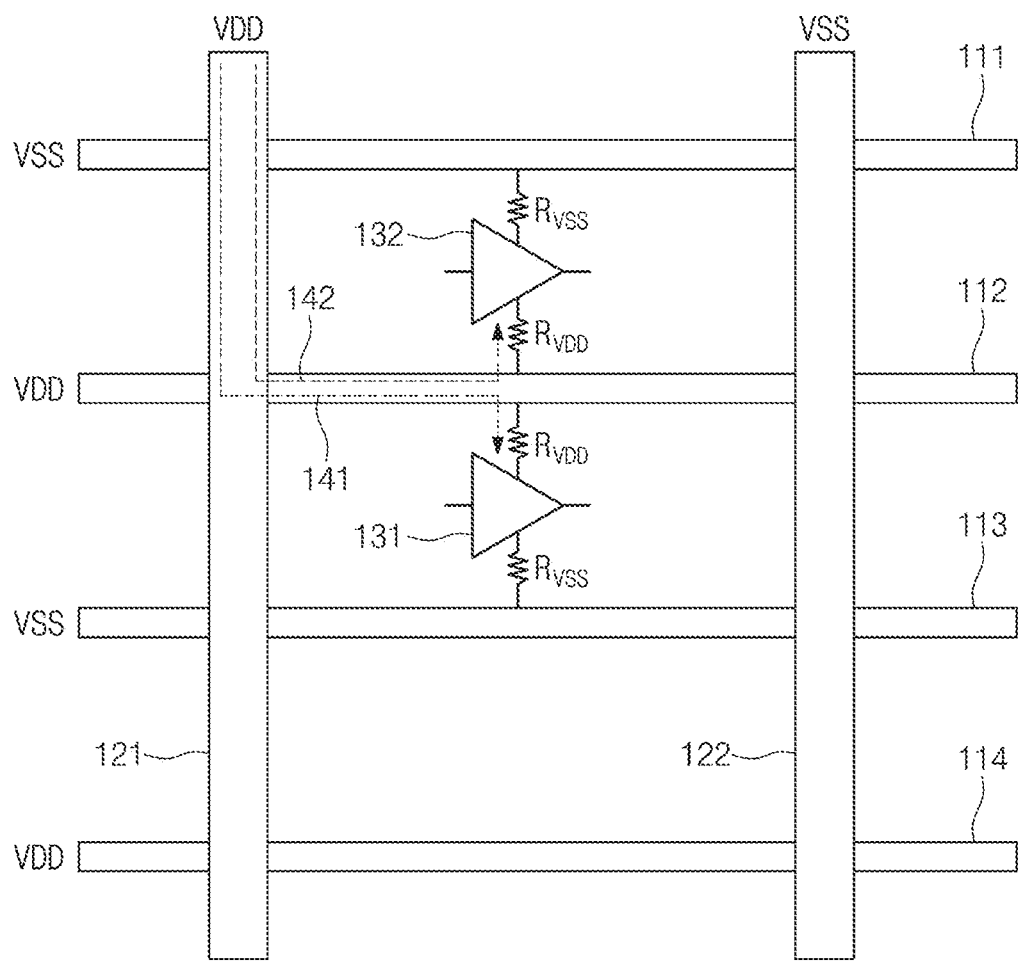
FIG. 1 is a view illustrating an integrated circuit according to an embodiment of the inventive concepts.
Figure 1:
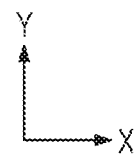

FIG. 1 is a view illustrating an integrated circuit according to an embodiment of the inventive concepts. Referring to FIG. 1, an integrated circuit 100 may include first power lines 111 to 114, second power lines 121 and 122, and first and second cells 131 and 132.

The first power lines 111 to 114 may be arranged at regular intervals along a Y-axis. The first power lines 111 and 113 may supply power VSS (e.g., a voltage) to cells in the integrated circuit 100, and the first power lines 112 and 114 may supply power VDD (e.g., a voltage) to the cells in the integrated circuit 100. Likewise, the second power lines 121 and 122 may be arranged at regular intervals along an X-axis. The second power line 121 may supply power VDD to the cells, and the second power line 122 may supply power VSS to the cells.

In an embodiment, the first power lines 111 to 114 may directly supply VDD or VSS to the cells, and the second power lines 121 and 122 may supply VDD or VSS to the first power lines 111 to 114. The first power lines 111 to 114 may be arranged on the same plane, and the second power lines 121 and 122 may be arranged on a plane that is higher than the plane where the first power lines 111 to 114 are arranged. A distance between the second power lines 121 and 122 may be greater than a distance between respective ones of the first power lines 111 to 114.

In an embodiment, vias (not illustrated) for connecting the first power lines 111 to 114 and the second power lines 121 and 122 may be arranged at some of the intersections of the first power lines 111 to 114 and the second power lines 121 and 122 (e.g., where the first power lines 111 to 114 overlap the second power lines 121 and 122). For example, a via may be arranged at an intersection of the first power line (VDD) 112 and the second power line (VDD) 121, and a via may be arranged at an intersection of the first power line (VSS) 113 and the second power line (VSS) 122.

The first cell 131 may be supplied with VDD through the first power line (VDD) 112 and may be supplied with VSS through the first power line (VSS) 113. The second cell 132 may be supplied with VDD through the first power line (VDD) 112 and may be supplied with VSS through the first power line (VSS) 111. In some embodiments, the first and second cells 131 and 132 may be a logic gate or a set of logic gates, which performs various logical operations (e.g., INV, NAND, AND, NOR, OR, XNOR, XOR, flip-flop, and/or the like). In some embodiments, the first and second cells 131 and 132 may be various memory cells (e.g., a dynamic random access memory (DRAM) cell, a static random access memory cell (SRAM) cell, a NAND cell, a NOR cell, a phase change random access memory (PRAM) cell, a ferroelectric random access memory (FRAM) cell, a magnetoresistive random access memory (MRAM) cell, a thyristor random access memory (TRAM) cell, a resistive random access memory (RRAM) cell, and/or the like) capable of storing data. In an embodiment, in addition to the first and second cells 131 and 132, other cells (not illustrated) may be further arranged between the first power lines 111 and 114, and the number of the first power lines 111 to 114 and the number of the second power lines 121 and 122 are not limited to the illustration of FIG. 1.

A delay (i.e., a propagation delay being a time difference between an input signal and an output signal of a cell) may occur in each of the first and second cells 131 and 132. The delay may be determined by the size of a cell, the size of a load cell, a slope of an input signal, a driving voltage, and/or the like. A delay of a cell may increase to be greater than the determined delay due to the process, voltage, and temperature (PVT) variation and/or may further increase as the frequency of use becomes higher. A voltage variation of the PVT variation may be generated by resistances of the first power lines 111 to 113 and the second power lines 121 and 122, which are connected to the first and second cells 131 and 132.

In detail, in some embodiments, the first cell 131 may perform a switching operation. The switching operation may mean an operation where an output signal is generated in response to an input signal in the first cell 131. The first cell 131 may be supplied with power necessary for the switching operation along a first path 141. However, since a voltage drop (i.e., the product of a resistance of the first path 141 and a current flowing through the first path 141) occurs due to the resistance of the first path 141 (i.e., a resistance of the first power line (VDD) 112 and a resistance of the second power line (VDD) 121), the first cell 131 may be supplied with a driving voltage lower than VDD. A power resistance $R_{VDD}$ between the first cell 131 and the first power line (VDD) 112 may indicate the resistance of the first path 141 through which the first cell 131 may be supplied with VDD. As in the above description, a power resistance $R_{VSS}$ between the first cell 131 and the first power line (VSS) 113 may indicate a resistance of a path through which the first cell 131 may be supplied with VSS. Due to the power resistance $R_{VSS}$, the first cell 131 may be supplied with a driving voltage higher than VSS. Here, the power resistances $R_{VDD}$ and $R_{VSS}$ represent resistances of a power line connected to a cell (e.g., resistances associated with a path over a first power line and/or a second power line) and are not specific physical elements arranged as illustrated in FIG. 1. To sum up, the power resistances $R_{VDD}$ and $R_{VSS}$ may cause a voltage variation (i.e., a voltage drop or a voltage bounce) at a cell. Due to the above-described voltage variation, a delay of a cell may further increase. FIG. 1 illustrates a power resistance $R_{VDD}$ and a power resistance $R_{VSS}$ for both the first cell 131 and the second cell 132. It will be understood that the $R_{VDD}$ and/or $R_{VSS}$ values for the second cell 132 may be different than those of the first cell 131.

While the first cell 131 performs the switching operation, the second cell 132 may also perform a switching operation. The second cell 132 may be supplied with power necessary for the switching operation through a second path 142. The amount of current flowing through the second power line (VDD) 121 and the first power line (VDD) 112 for supplying power to the first and second cells 131 and 132 may be greater than that for supplying power only to the first cell 131. Accordingly, the voltage drop occurring at the power resistance $R_{VDD}$ of the first cell 131 may increase. That is, a delay of the first cell 131 may further increase due to the switching operation of the second cell 132. In this case, the first cell 131 is a victim cell, and the second cell 132 is an aggressor cell. As used herein, an aggressor cell may be a cell within the integrated circuit whose operation may affect one or more other cells in the integrated circuit. A victim cell may be a cell within the integrated circuit that is affected by the aggressor cell. Accordingly, to determine the delay of the first cell 131, a voltage variation due to the switching operation of the second cell (the aggressor cell) 132 as well as a voltage variation due to the switching operation of the first cell 131 itself should be considered.

The inventive concepts may provide integrated circuits considering both a voltage variation (SIVD (self-induced voltage drop) and SIVB (self-induced voltage bounce)) due to a switching operation of a cell itself and a voltage variation (AIVD (aggressor-induced voltage drop) and AIVB (aggressor-induced voltage bounce)) due to a switching operation of an aggressor cell, design methods of the integrated circuits, and electronic design automation (EDA) programs performing the design methods. Below, according to an embodiment of the inventive concepts, a method of extracting power resistances of cells in the integrated circuit 100 will be described.

Figure 2:
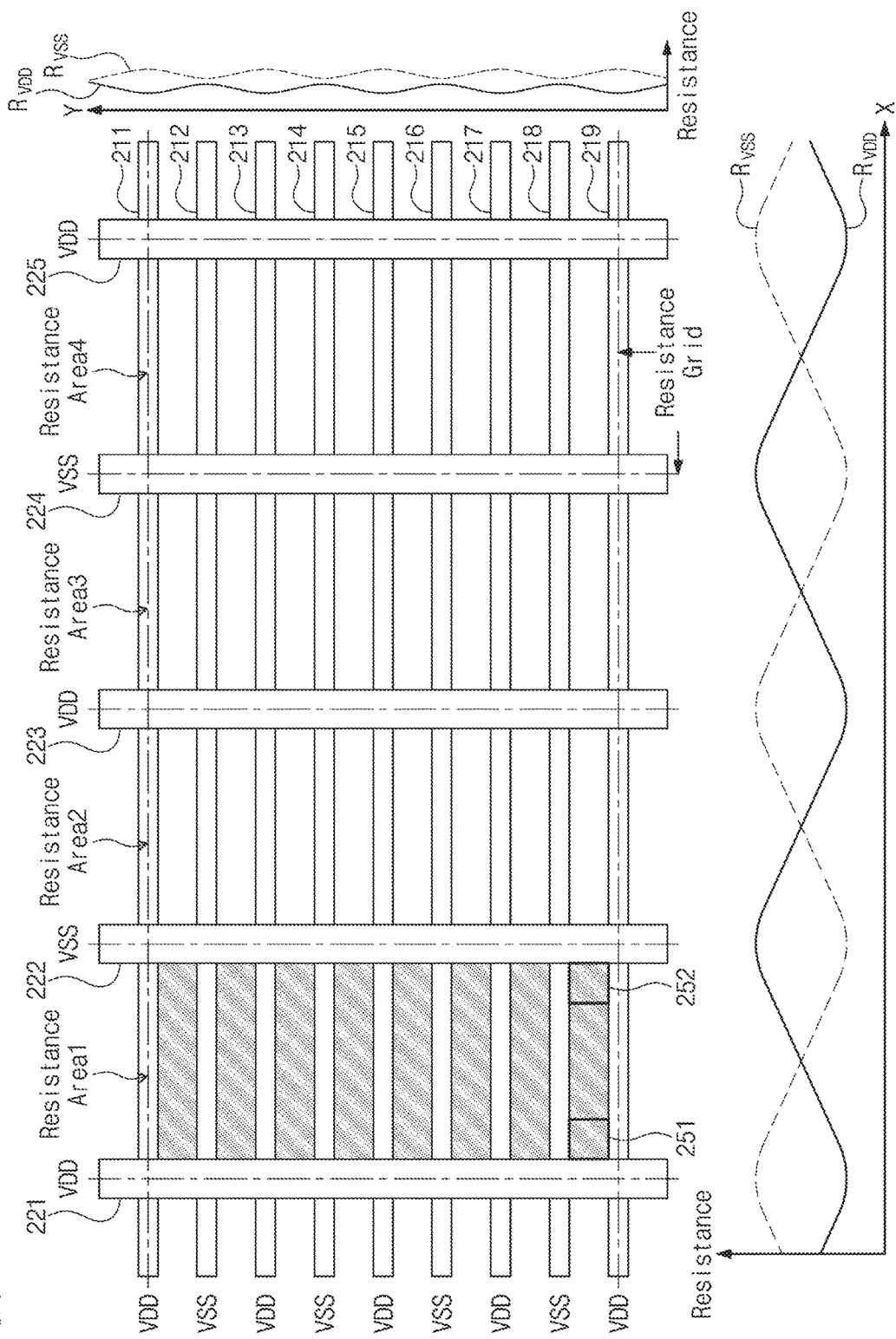
FIG. 2 is a view illustrating a resistance grid set according to an embodiment of the inventive concepts.

FIG. 2 is a view illustrating a resistance grid set according to an embodiment of the inventive concepts. Referring to FIG. 2, an integrated circuit 200 may include first power lines 211 to 219 arranged along a Y-axis and second power lines 221 to 225 arranged along an X-axis. The first power lines 211 to 219 and the second power lines 221 to 225 may be arranged in a lattice shape. Here, the first power lines 211 to 219 and the second power lines 221 to 225 arranged in the lattice shape form a power grid.

Like the integrated circuit 100 of FIG. 1, cells may be arranged between the first power lines 211 to 219 of the integrated circuit 200, but the cells are not illustrated for brevity of illustration.

The first power lines 211 to 219 may be arranged to be denser (e.g., closer together) than the second power lines 221 to 225. Accordingly, a contribution to the power resistances $R_{VDD}$ and $R_{VSS}$ of cells arranged in a Y-axis direction may be substantially uniform. In contrast, a distance between the second power lines 221 to 225 may be greater than a distance between the first power lines 211 to 219. Accordingly, a contribution to the power resistances $R_{VDD}$ and $R_{VSS}$ of cells arranged in an X-axis direction may be distributed as illustrated in FIG. 2, depending on locations on the X-axis. In detail, a contribution to the power resistance $R_{VDD}$ on the X-axis may be minimal at locations where the second power lines 221, 223, and 225 supplying VDD are arranged and may be maximal at locations where the second power lines 222 and 224 supplying VSS are arranged. Since the second power lines 221, 223, and 225 and the second power lines 222 and 224 may be alternately arranged, a distribution of the power resistance $R_{VSS}$ may be different from a distribution of the power resistance $R_{VDD}$ (i.e., the power resistance $R_{VSS}$ may be maximal when the power resistance $R_{VDD}$ is minimal, and the power resistance $R_{VSS}$ may be minimal when the power resistance $R_{VDD}$ is maximal). Since a lot of time is needed to extract the power resistances $R_{VDD}$ and $R_{VSS}$ of each of a plurality of cells arranged in the integrated circuit 200, an integrated circuit designing method according to an embodiment of the inventive concepts provides a method capable of extracting the power resistances $R_{VDD}$ and $R_{VSS}$ quickly.

First, a resistance grid (illustrated by an alternated long and short dash line) may be set along the first power lines 211 to 219 and the second power lines 221 to 225. As in a power grid, the resistance grid may be set in a lattice shape. The resistance grid may include first to fourth resistance areas (e.g., Resistance Area1, Resistance Area2, Resistance Area3, and Resistance Area4). However, as described with reference to FIG. 1, since the number of the first power lines 211 to 219 and the number of the second power lines 221 to 225 are not limited to the illustration of FIG. 2, the number of resistance areas is not limited to those illustrated in FIG. 2. The power resistances $R_{VDD}$ and $R_{VSS}$ of cells may be calculated in each of the first to fourth resistance areas.

A height of the first resistance area (Resistance Area1—a shaded resistance area) may be set to eight times an interval between adjacent ones of the first power lines 211 to 219, and a width of the first resistance area may be set to an interval between adjacent ones of the second power lines 221 to 225. In the first resistance area, the power resistances $R_{VDD}$ and $R_{VSS}$ of a cell 251, which is close to the second power line (VDD) 221 and is comparatively farther away from the second power line (VSS) 222, and the power resistances $R_{VDD}$ and $R_{VSS}$ of a cell 252, which is close to the second power line (VSS) 222 and is comparatively farther away from the second power line (VDD) 221, may be respectively extracted. In the first resistance area, a distribution of the power resistances $R_{VDD}$ and $R_{VSS}$ of cells arranged along the X-axis may have linearity as illustrated in FIG. 2. Accordingly, the power resistances $R_{VDD}$ and $R_{VSS}$ of the remaining cells (not illustrated) of the first resistance area except for the cells 251 and 252 may be calculated by using linear interpolation. In an embodiment, the cells 251 and 252 need not be close to or far away from a second power line. The cells 251 and 252 may be cells arranged at any two points along the X-axis within a resistance area, so as to use the linear interpolation.

As described above, in the first resistance area, a distribution of the power resistances $R_{VDD}$ and $R_{VSS}$ of cells arranged along the Y-axis may be almost uniform as illustrated in FIG. 2. Accordingly, the power resistances $R_{VDD}$ and $R_{VSS}$ of cells (not illustrated) arranged along the Y-axis with the same coordinate on the X-axis as the cell 251 may be set to be the same as the power resistances $R_{VDD}$ and $R_{VSS}$ of the cell 251.

A width and a height of a resistance area may be determined in consideration of linearity, uniformity, accuracy, extraction time, and/or the like of a distribution of the power resistances $R_{VDD}$ and $R_{VSS}$. As illustrated in FIG. 2, the width of the resistance area may be set to correspond to a section where a distribution of the power resistances $R_{VDD}$ and $R_{VSS}$ has linearity along the X-axis. As the height of the resistance area increases, a time to extract and calculate the power resistances $R_{VDD}$ and $R_{VSS}$ may decrease, but accuracy may also decrease. An example is illustrated in FIG. 2 as the height of the resistance area is set to eight times an interval between the first power lines 211 to 219, but the height of the resistance area may be changed in consideration of linearity, uniformity, accuracy, extraction time, and/or the like.

Figure 3:
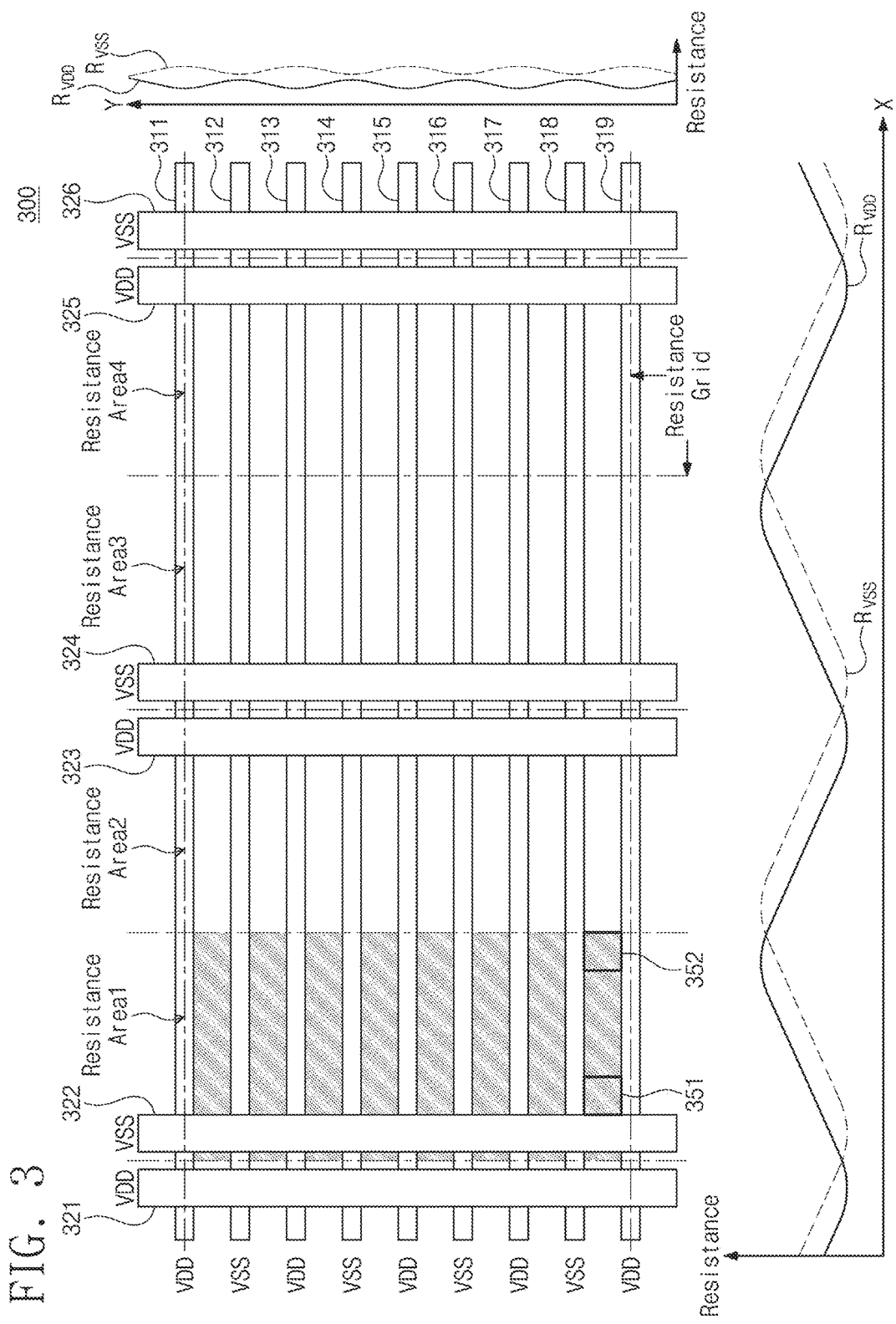
FIG. 3 is a view illustrating another resistance grid set according to an embodiment of the inventive concepts.

FIG. 3 is a view illustrating another resistance grid set according to an embodiment of the inventive concepts. Referring to FIG. 3, an integrated circuit 300 may include first power lines 311 to 319 arranged along the Y-axis and second power lines 321 to 326 arranged along the X-axis. Unlike the integrated circuit 200 of FIG. 2, the second power line (VDD) 321 and the second power line (VSS) 322 may be adjacent to each other. That is, in the integrated circuit 300, the second power lines 321, 323, and 325 supplying VDD and the second power lines 322, 324, and 326 supplying VSS may be respectively arranged adjacent (e.g., in proximity) to each other.

As in the integrated circuit 200 of FIG. 2, a contribution to the power resistances $R_{VDD}$ and $R_{VSS}$ of cells arranged in line in the Y-axis direction in the integrated circuit 300 may be almost uniform regardless of locations on the Y-axis. In contrast, a contribution to the power resistances $R_{VDD}$ and $R_{VSS}$ of cells arranged in line in the X-axis direction may be distributed as illustrated in FIG. 3, depending on locations on the X-axis. A contribution to the power resistance $R_{VDD}$ on the X-axis may be minimal at locations where the second power lines 321, 323, and 325 supplying VDD are arranged and may be maximal at an intermediate point of the second power lines 321 and 323 and an intermediate point of the second power lines 323 and 325. As in the above description, a contribution to the power resistance $R_{VSS}$ may be minimal at locations where the second power lines 322, 324, and 326 supplying VSS are arranged and may be maximal at an intermediate point of the second power lines 322 and 324 and an intermediate point of the second power lines 324 and 326. Since the second power lines 321, 323, and 325 supplying VDD and the second power lines 322, 324, and 326 supplying VSS are adjacent (e.g., near) to each other, with regard to cells arranged in parallel with the X-axis, a distribution of the power resistance $R_{VDD}$ and a distribution of the power resistance $R_{VSS}$ may be similar to each other.

As in the above description given with reference to FIG. 2, a resistance grid (illustrated by an alternated long and short dash line) may be set along the first power lines 311 to 319 and the second power lines 321 to 326. As in a power grid, the resistance grid may be set in a lattice shape. The resistance grid may include first to fourth resistance areas (e.g., Resistance Area1, Resistance Area2, Resistance Area3, and Resistance Area4). However, the number of resistance areas is not limited to the illustration of FIG. 3 and may be determined according to the resistance grid. As in the manner described with reference to FIG. 2, the power resistances $R_{VDD}$ and $R_{VSS}$ of cells may be calculated in each of the first to fourth resistance areas.

Referring to FIG. 3, a height of the first resistance area (Resistance Area1—a shaded resistance area) may be set to eight times an interval between adjacent ones of the first power lines 311 to 319, and a width of the first resistance area may be set to half an interval between the second power lines 321 and 323. That is, a width of a resistance area may be set to correspond to a section where a distribution of the power resistances $R_{VDD}$ and $R_{VSS}$ may be substantially linear.

In the first resistance area, the power resistances $R_{VDD}$ and $R_{VSS}$ of a cell 351, which is close to the second power line (VDD) 321 and the second power line (VSS) 322, and the power resistances $R_{VDD}$ and $R_{VSS}$ of a cell 352, which is comparatively farther away from the second power lines (VDD) 321 and 323 and the second power lines (VSS) 322 and 324 may be extracted. In the first resistance area, a distribution of the power resistances $R_{VDD}$ and $R_{VSS}$ of cells arranged along the X-axis may be substantially linear as illustrated in FIG. 3. Accordingly, the power resistances $R_{VDD}$ and $R_{VSS}$ of the remaining cells (not illustrated) of the first resistance area except for the cells 351 and 352 may be calculated by using linear interpolation. Also, the power resistances $R_{VDD}$ and $R_{VSS}$ of cells (not illustrated) arranged along the Y-axis with the same coordinate on the X-axis as the cell 351 may be set to be the same as the power resistances $R_{VDD}$ and $R_{VSS}$ of the cell 351.

According to an embodiment of the inventive concepts, a plurality of cells in the integrated circuit 200 or 300 may be classified according to a plurality of resistance areas. In each resistance area, the power resistances $R_{VDD}$ and $R_{VSS}$ of cells that are close to a second power line or are farther away from the second power line may be extracted. The power resistances $R_{VDD}$ and $R_{VSS}$ of the remaining cells may be calculated by the linear interpolation by using the extracted power resistances $R_{VDD}$ and $R_{VSS}$. Below, a method of calculating a delay of a plurality of cells generated by the power resistances $R_{VDD}$ and $R_{VSS}$ of the plurality of cells will be described.

Figure 4:
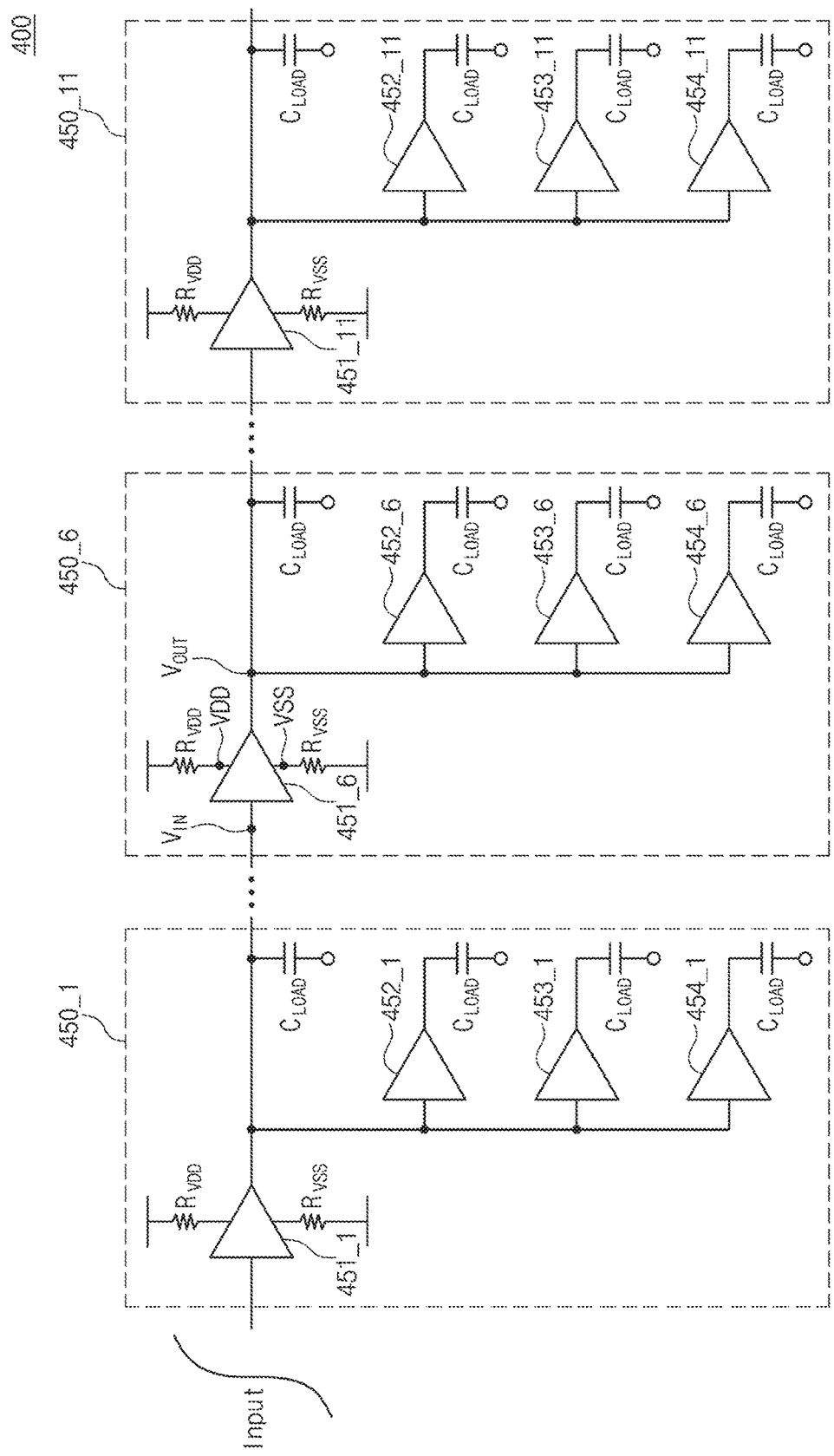
FIG. 4 is an example delay chain for indicating a delay average of a plurality of cells in an integrated circuit.

FIG. 4 is an example delay chain 400 for indicating a delay average of a plurality of cells in an integrated circuit. A plurality of cells in an integrated circuit may have various delays. A calculation time (e.g., a run-time of the EDA program) may increase upon calculating a delay of each of the plurality of cells. A delay distribution of the plurality of cells may be various. Accordingly, a way to measure a delay of a reference cell indicating a delay average of the plurality of cells and calculate or estimate a delay of each of the remaining cells from the measured delays is efficient.

Referring to FIG. 4, a delay chain 400 may include delay stages 450_1 to 450_11. The delay chain 400 may be a circuit representation stored in a database of a computer-aided design (CAD) tool for indicating an average of delays of the plurality of cells in the integrated circuit. An embodiment is illustrated in FIG. 4 where the number of the delay stages 450_1 to 450_11 is eleven, with delay stages 450_1, 450_6, and 450_11 being illustrated.

The first delay stage 450_1 may include a drive cell 451_1 and load cells 452_1, 453_1, and 454_1. Here, a load capacitor $C_{LOAD}$ is an element obtained by modeling capacitors (e.g., a capacitor of a line connecting the drive cell 451_1, the load cells 452_1, 453_1, and 454_1, and a second delay stage 450_2 (not illustrated), an input capacitor of each of the load cells 452_1, 453_1, and 454_1 and the second delay stage 450_2, and the like) connected to an output terminal of the drive cell 451_1. The number of the load cells 452_1, 453_1, and 454_1 may be determined by a fan-out of the drive cell 451_1. In an embodiment, the fan-out of the drive cell 451_1 is four (the load cells 452_1, 453_1, and 454_1, and the second delay stage 450_2 (not illustrated)).

In an embodiment, an integrated circuit may include a plurality of delay chains composed of one or more cells, and the numbers of delay stages of the plurality of delay chains may be different from each other. Also, fan-outs of the plurality of cells in the integrated circuit may be different from each other. The delay chain 400 may be a circuit modeled to indicate a delay average of the plurality of cells in the integrated circuit. Accordingly, the reference cell may be determined based on the number of delay stages of a delay chain in the integrated circuit and a fan-out of each of the plurality of cells.

In an embodiment, the second to eleventh delay stages 450_2 to 450_11 may be implemented similarly as the first delay stage 450_1. The drive cells 451_1 to 451_11 and the load cells 452_1 to 452_11, 453_1 to 453_11, and 454_1 to 454_11 may be implemented to be the same or similar as each other.

The drive cell 451_6 of the sixth delay stage 450_6 placed at the center of the delay chain 400 may be selected as the reference cell to indicate a delay average of the plurality of cells. In an embodiment, the reference cell 451_6 may perform a buffer role of transferring a signal output from a previous delay stage to a next delay stage. In another embodiment, the reference cell 451_6 may be implemented with various logic gates (e.g., INV, NAND, AND, NOR, OR, XNOR, XOR, flip-flop, and/or the like) in addition to a buffer.

A timing derate (e.g., a characterization of a delay for a cell) may be determined based on a ratio of a delay of a cell when the power resistances $R_{VDD}$ and $R_{VSS}$ are considered, to a delay of a cell when the power resistances $R_{VDD}$ and $R_{VSS}$ are not considered (i.e., the case where it is assumed that the power resistances $R_{VDD}$ and $R_{VSS}$ are "0"). A detailed process where the timing derate is calculated will be described with reference to FIGS. 5 and 6.

Figure 5:
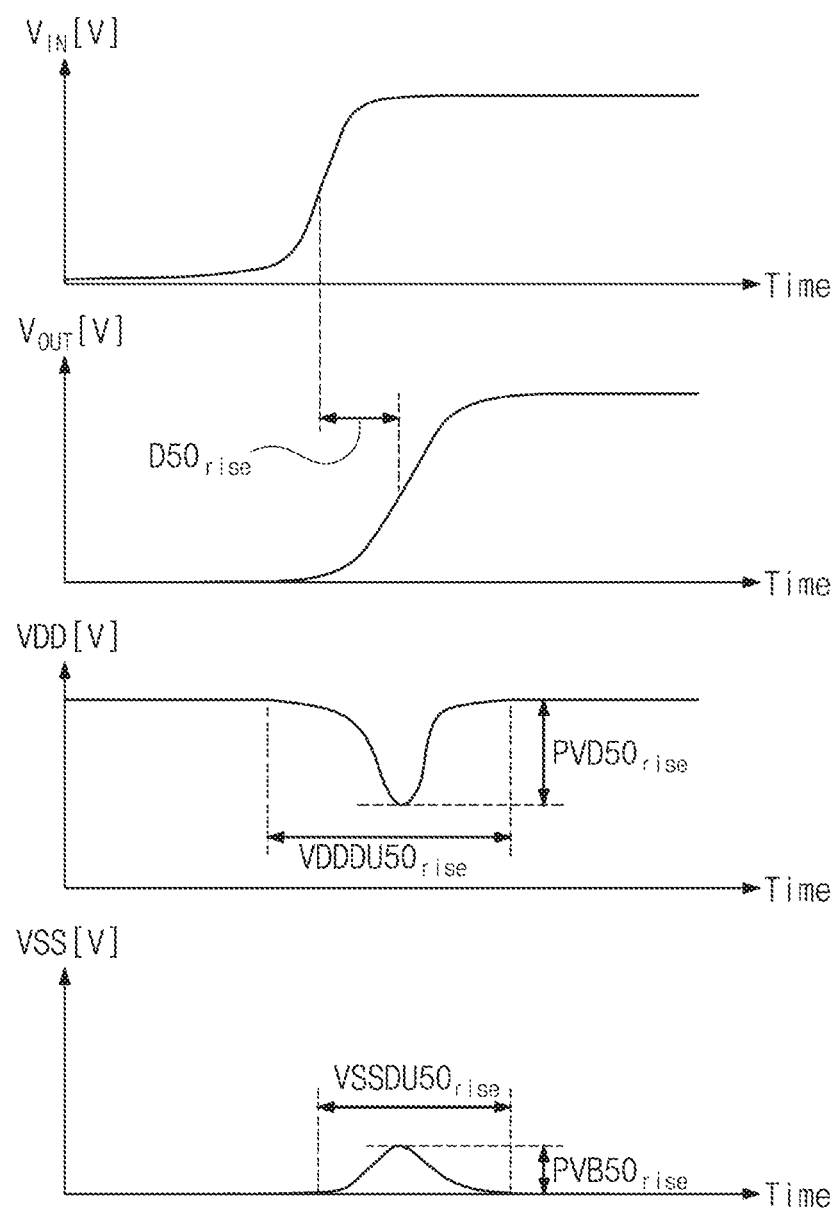
FIGS. 5 and 6 are views illustrating an operation of a reference cell illustrated in FIG. 4.
Figure 6:
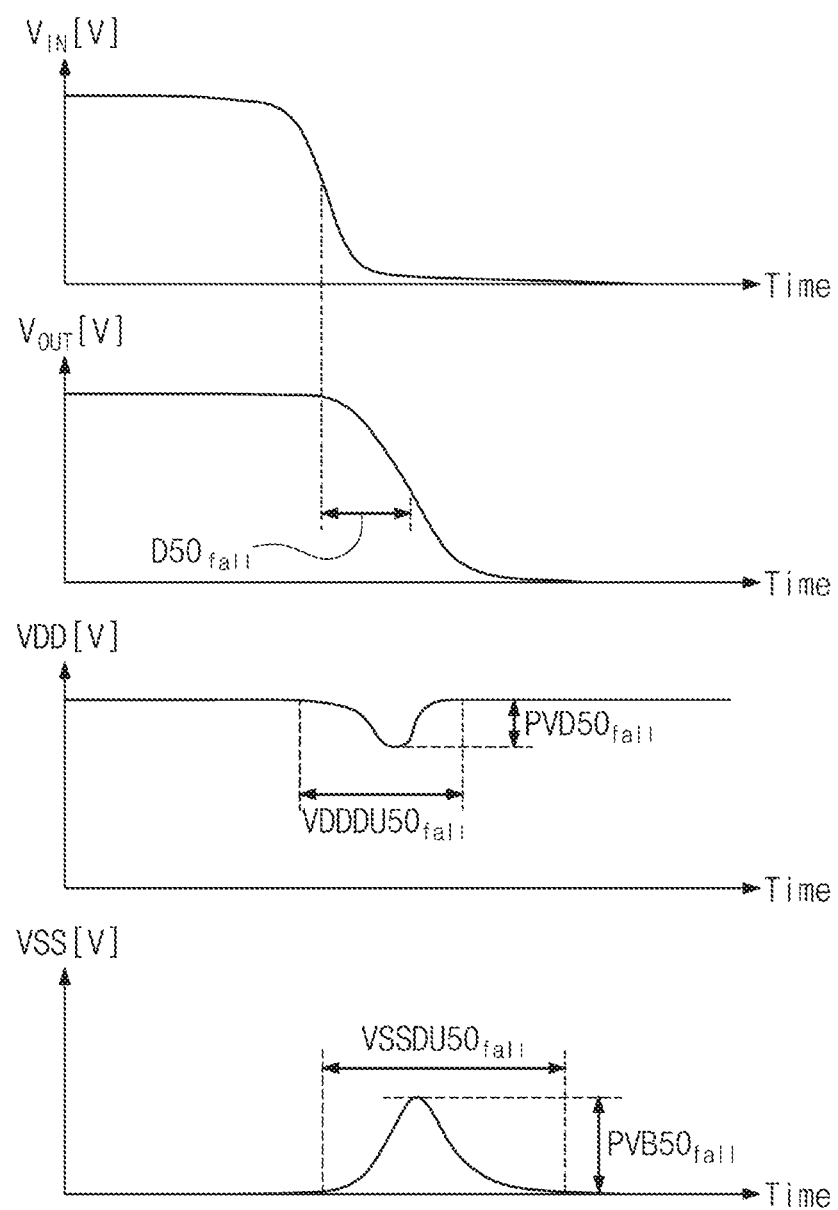

FIGS. 5 and 6 are views illustrating an operation of a reference cell (e.g., reference cell 451_6) illustrated in FIG. 4. FIGS. 5 and 6 will be described with reference to FIG. 4, and a reference cell 451_6 may be a buffer. To calculate the timing derate, a delay when the power resistances $R_{VDD}$ and $R_{VSS}$ of the reference cell 451_6 are 50Ω and a delay when the power resistances $R_{VDD}$ and $R_{VSS}$ of the reference cell 451_6 are 0Ω may be measured, respectively. Here, a delay may be a propagation delay of the reference cell 451_6.

FIG. 5 illustrates the case where an output $V_{OUT}$ of the reference cell 451_6 rises from low to high, and FIG. 6 illustrates the case where the output $V_{OUT}$ of the reference cell 451_6 falls from high to low.

Referring to FIG. 5, according to a variation of an input $V_{IN}$, waveforms of the output $V_{OUT}$ and powers VDD and VSS are illustrated in FIG. 5. A rise delay $D50_{rise}$ between the input $V_{IN}$ and the output $V_{OUT}$, a peak voltage drop $PVD50_{rise}$, a peak voltage bounce $PVB50_{rise}$, a voltage drop duration $VDDDU50_{rise}$, and a voltage bounce duration $VSSDU50_{rise}$ may be measured.

Here, the rise delay $D50_{rise}$ may mean a time difference between a 50% point of the variation of the input voltage $V_{IN}$ and a 50% point of a rise of the output $V_{OUT}$ (in FIG. 5, since the reference cell 451_6 is a buffer, the input $V_{IN}$ is illustrated as rising; but, in the case where the reference cell 451_6 is another logic gate except for a buffer, the input $V_{IN}$ may fall). A reference voltage variation duration may indicate the voltage drop duration or the voltage bounce duration. In each of $D50_{rise}$, $PVD50_{rise}$, $PVB50_{rise}$, $VDDDU50_{rise}$, and $VSSDU50_{rise}$, "50" means that the power resistances $R_{VDD}$ and $R_{VSS}$ of a reference cell are 50Ω. However, in the inventive concepts, the power resistances $R_{VDD}$ and $R_{VSS}$ of the reference cell may be referred to as "reference power resistances," and a value thereof is not limited to the above-described numerical value.

A rise timing derate $TSIVD50_{rise}$ may be calculated through the following Equation 1.

$$TSIVD50_{rise} = \frac{D50_{rise} - D0_{rise}}{D0_{rise}} \times 100 \quad \text{[Equation 1]}$$

In Equation 1, "$D50_{rise}$" means a rise delay of the reference cell 451_6 for the case where the power resistances $R_{VDD}$ and $R_{VSS}$ are 50Ω, and "$D0_{rise}$" means a rise delay of the reference cell 451_6 for the case where the power resistances $R_{VDD}$ and $R_{VSS}$ are 0Ω. For example, as discussed herein, $D50_{rise}$ may be calculated for the reference cell 451_6 assuming that the power resistances $R_{VDD}$ and $R_{VSS}$ are 50Ω. Similarly, $D0_{rise}$ may be calculated for the reference cell 451_6 assuming that power resistances $R_{VDD}$ and $R_{VSS}$ are 0Ω. Accordingly, the rise timing derate $TSIVD50_{rise}$ may indicate the degree of rise delay of the reference cell 451_6 due to the power resistances $R_{VDD}$ and $R_{VSS}$. In detail, the rise timing derate $TSIVD50_{rise}$ may be calculated based on a difference between $D50_{rise}$ and $D0_{rise}$.

Referring to FIG. 6, according to a variation of the input $V_{IN}$, waveforms of the output $V_{OUT}$ and the powers VDD and VSS are illustrated in FIG. 6. A fall delay $D50_{fall}$ between the input $V_{IN}$ and the output $V_{OUT}$, a peak voltage drop $PVD50_{fall}$, a peak voltage bounce $PVB50_{fall}$, a voltage drop duration $VDDDU50_{fall}$, and a voltage bounce duration $VSSDU50_{fall}$ may be measured. Here, the fall delay $D50_{fall}$ may mean a time difference between a 50% point of the variation of the input voltage $V_{IN}$ and a 50% point of a fall of the output $V_{OUT}$.

A fall timing derate $TSIVD50_{fall}$ of the reference cell 451_6 may be calculated through the following Equation 2.

$$TSIVD50_{fall} = \frac{D50_{fall} - D0_{fall}}{D0_{fall}} \times 100 \quad \text{[Equation 2]}$$

In Equation 2, "$D50_{fall}$" means a fall delay of the reference cell 451_6 for the case where the power resistances $R_{VDD}$ and $R_{VSS}$ are 50Ω, and "$D0_{fall}$" means a fall delay of the reference cell 451_6 for the case where the power resistances $R_{VDD}$ and $R_{VSS}$ are 0Ω. Accordingly, the fall timing derate $TSIVD50_{fall}$ may indicate the degree of fall delay of the reference cell 451_6 due to the power resistances $R_{VDD}$ and $R_{VSS}$. In detail, the fall timing derate $TSIVD50_{fall}$ may be calculated based on a difference between $D50_{fall}$ and $D0_{fall}$.

The following Tables 1 and 2 show results of measuring or calculating the above-described characteristics depending on the size (e.g., BUF_X1, BUF_X2, etc.) of the reference cell 451_6.

TABLE 1

| Cell | $TSIVD50_{rise}$ | $PVD50_{rise}$ | $VDDDU50_{rise}$ | $PVB50_{rise}$ | $VSSDU50_{rise}$ |
|---|---|---|---|---|---|
| BUF_X1 | +1% | 5 mV | 5 ps | 1 mV | 2 ps |
| BUF_X2 | +3% | 10 mV | 10 ps | 2 mV | 4 ps |
| BUF_X3 | +4% | 12 mV | 12 ps | 2 mV | 4 ps |
| BUF_X4 | +5% | 14 mV | 15 ps | 3 mV | 5 ps |
| ... | ... | ... | ... | ... | ... |

TABLE 2

| Cell | $TSIVD50_{fall}$ | $PVD50_{fall}$ | $VDDDU50_{fall}$ | $PVB50_{fall}$ | $VSSDU50_{fall}$ |
|---|---|---|---|---|---|
| BUF_X1 | +2% | 2 mV | 2 ps | 6 mV | 6 ps |
| BUF_X2 | +3% | 3 mV | 3 ps | 11 mV | 10 ps |
| BUF_X3 | +4% | 3 mV | 4 ps | 12 mV | 12 ps |
| BUF_X4 | +6% | 4 mV | 5 ps | 13 mV | 15 ps |
| ... | ... | ... | ... | ... | ... |

As illustrated in Tables 1 and 2, the Cell column indicates a size of the buffer cell, with BUF_X2 being larger than BUF_X1, BUF_X3 being larger than BUF_X2, and so on. As the size of the reference cell 451_6 increases (X1, X2, X3, X4, . . . ), a current of a switching operation necessary in the reference cell 451_6 increases, and a reference voltage variation PVD50$_{rise}$, PVB50$_{rise}$, PVD50$_{fall}$, and PVB50$_{fall}$ of the reference cell 451_6 becomes greater. Accordingly, it may be understood from Table 1 and Table 2 that the rise timing derate TSIVD50$_{rise}$ and the fall timing derate TSIVD50$_{fall}$ increase as the size of the reference cell 451_6 increases.

Data of Table 1 and Table 2 relate to the case where the reference cell 451_6 is a buffer. As described above, the reference cell 451_6 is not limited to the buffer illustrated in FIG. 4. The reference cell 451_6 may be determined according to various kinds of a plurality of cells that may be used in an integrated circuit. For example, in the case where a 2-input NAND is used in an integrated circuit, data of Table 1 and Table 2 may further include characteristics TSIVD50$_{rise}$, PVD50$_{rise}$, VDDDU50$_{rise}$, PVB50$_{rise}$, VSSDU50$_{rise}$, TSIVD50$_{fall}$, PVD50$_{fall}$, VDDDU50$_{fall}$, PVB50$_{fall}$, and VSSDU50$_{fall}$ corresponding to the case where a reference cell is a 2-input NAND. That is, Table 1 and Table 2 may further include data for the case where the reference cell 451_6 is implemented with various logic gates.

Information of the reference cell 451_6 characterized in Table 1 and Table 2 may be stored in a library (library characterization). Below, a method of calculating a timing derate due to the power resistances R$_{VDD}$ and R$_{VSS}$ of each of a plurality of cells in an integrated circuit by using a library with respect to a reference cell will be described.

In general, as the power resistances R$_{VDD}$ and R$_{VSS}$ become greater, the voltage variation PVD50$_{rise}$, PVB50$_{rise}$, PVD50$_{fall}$, and PVB50$_{fall}$ occurring in a cell increases. Accordingly, PVD$_{rise}$, PVB$_{rise}$, PVD$_{fall}$, and PVB$_{fall}$ of any cell may be calculated by the following equations based on a ratio of the power resistances R$_{VDD}$ and R$_{VSS}$ of the cell to the power resistances R$_{VDD}$ and R$_{VSS}$ of the reference cell 451_6.

$$PVD_{rise} = \frac{R_{VDD}}{50} \times PVD50_{rise} \quad \text{[Equation 3]}$$

$$PVD_{rise} = \frac{R_{VSS}}{50} \times PVB50_{rise} \quad \text{[Equation 4]}$$

$$PVD_{fall} = \frac{R_{VDD}}{50} \times PVD50_{fall} \quad \text{[Equation 5]}$$

$$PVB_{fall} = \frac{R_{VSS}}{50} \times PVB50_{fall} \quad \text{[Equation 6]}$$

In Equation 3 to Equation 6, "50" means a value of the power resistances R$_{VDD}$ and R$_{VSS}$ of the reference cell 451_6. Accordingly, a voltage variation such as a peak voltage drop PVD$_{rise}$ or PVD$_{fall}$ or a peak voltage bounce PVB$_{rise}$ or PVB$_{fall}$ of any cell may be calculated by using a value that is obtained by adjusting a voltage variation of the reference cell 451_6 depending on a ratio of the power resistances R$_{VDD}$ and R$_{VSS}$ of the cell to the power resistances R$_{VDD}$ and R$_{VSS}$ of the reference cell 451_6. Depending on the result of Equation 3 to Equation 6, the rise timing derate TSIVD$_{rise}$ and the fall timing derate TSIVD$_{fall}$ of any cell may be calculated by the following equations.

$$TSIVD_{rise} = \frac{PVD_{rise} + PVB_{rise}}{PVD50_{rise} + PVB50_{rise}} \times TSIVD50_{rise} \quad \text{[Equation 7]}$$

$$TSIVD_{fall} = \frac{PVD_{fall} + PVB_{fall}}{PVD50_{fall} + PVB50_{fall}} \times TSIVD50_{fall} \quad \text{[Equation 8]}$$

Below, a detailed example of calculating a timing derate for any cell in an integrated circuit will be described.

Figure 7:
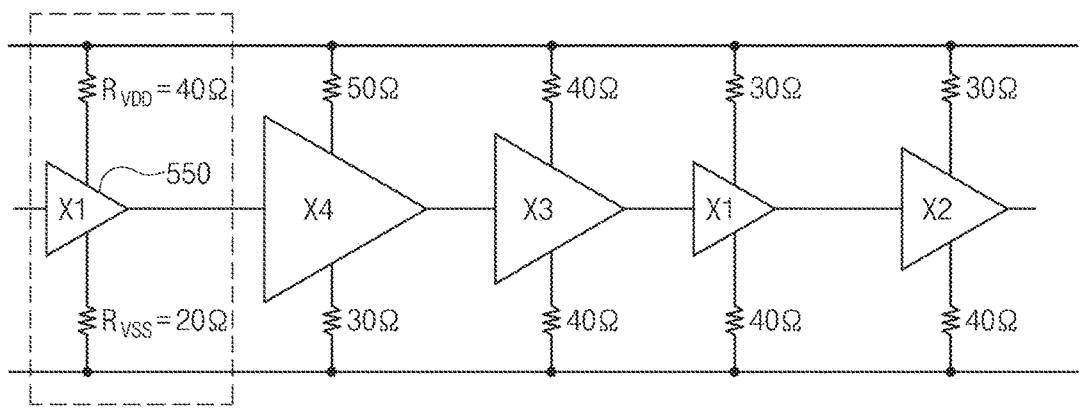
FIG. 7 is a view illustrating a part of the integrated circuit including a plurality of cells having various power resistances.

FIG. 7 is a view illustrating a part of an integrated circuit 500 including a plurality of cells having various power resistances. Five cells having various sizes X1, X2, X3, and X4 included in an integrated circuit 500 are illustrated in FIG. 7. A result of calculating a timing derate of a cell 550, the size of which is X1 and which has the power resistance R$_{VDD}$ of 40Ω and the power resistance R$_{VSS}$ of 20Ω, from among the five cells will be described.

PVD$_{rise}$ of the cell 550 may be calculated to be 4 mV (=40Ω/50Ω×5 mV) depending on Equation 3, PVB$_{rise}$ is calculated to be 0.4 mV (=20Ω/50Ω×1 mV) depending on Equation 4, and TSIVD$_{rise}$ is calculated to be +0.7% (=(4 mV+0.4 mV)/(5 mV+1 mV)×(+1%)) depending on Equation 7. Here, 5 mV (PVD50$_{rise}$ of a reference cell), 1 mV (PVB$_{rise}$ of the reference cell), and +1% (TSIVD50$_{rise}$ of the reference cell) may be values that are measured or calculated in advance, such as those in Table 1.

PVD$_{fall}$ of the cell 550 is calculated to be 1.6 mV (=40Ω/50Ω×2 mV) depending on Equation 5, PVB$_{fall}$ is calculated to be 2.4 mV (=20Ω/50Ω×6 mV) depending on Equation 6, and TSIVD$_{fall}$ is calculated to be +1% (=(1.6 mV+2.4 mV)/(2 mV+6 mV)×(+2%)) depending on Equation 8. Here, 2 mV (PVD50$_{fall}$ of reference cell), 6 mV (PVB50$_{fall}$ of the reference cell), and +2% (TSIVD50$_{fall}$ of the a reference cell) may be values that are measured or calculated in advance, such as those in Table 2.

To sum up, it is inefficient to calculate a timing derate by analyzing an input waveform and an output waveform in each of a plurality of cells in the integrated circuit 500. According to an embodiment of the inventive concepts, first, if a timing derate is calculated by analyzing an input waveform and an output waveform in a reference cell, a timing derate of any cell may be calculated by using a ratio of a power resistance of any cell (i.e., a cell different from the reference cell) in an integrated circuit to a power resistance of the reference cell.

In addition, a rise voltage variation SIVD$_{rise}$ and a fall voltage variation SIVD$_{fall}$ due to the power resistances R$_{VDD}$ and R$_{VSS}$ of a cell may be respectively calculated by the following equations.

$$SIVD_{rise} = PVD_{rise} + PVB_{rise} \quad \text{[Equation 9]}$$

$$SIVD_{fall} = PVD_{fall} + PVB_{fall} \quad \text{[Equation 10]}$$

The voltage variations SIVD$_{rise}$ and SIVD$_{fall}$ due to the power resistances R$_{VDD}$ and R$_{VSS}$ of a cell defined in Equation 9 and Equation 10 may be used in the process of calculating a timing derate of a victim cell due to an aggressor cell to be described later.

A method of calculating a timing derate of a cell itself due to the power resistances R$_{VDD}$ and R$_{VSS}$ of the cell is described with reference to FIG. 7. Below, a method of calculating a timing derate of a victim cell due to an aggressor cell will be described.

Figure 8:
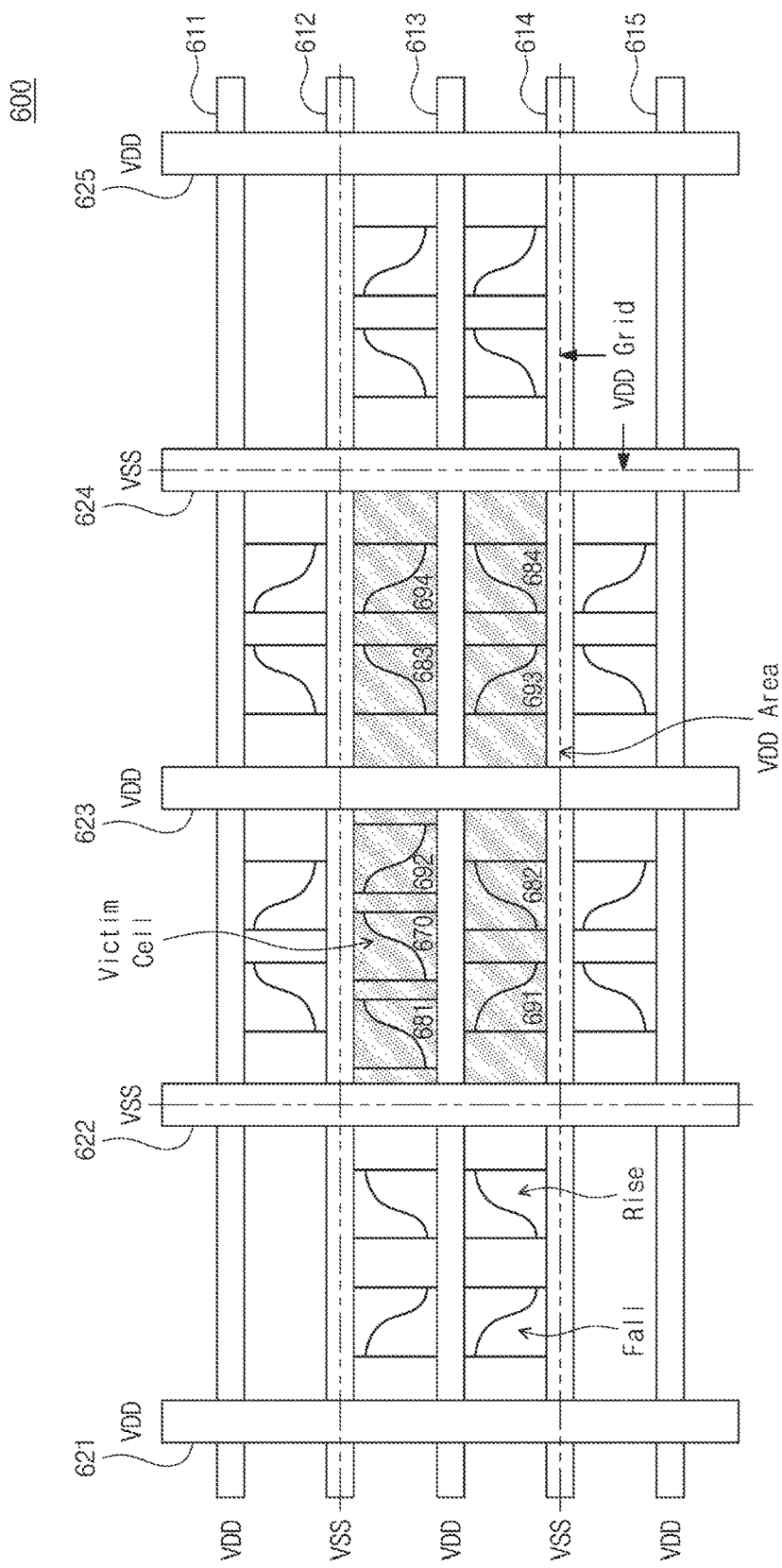
FIG. 8 is a view illustrating a voltage grid set according to an embodiment of the inventive concepts.

FIG. 8 is a view illustrating a voltage grid set according to an embodiment of the inventive concepts. Referring to FIG. 8, an integrated circuit 600 may include first power lines 611 to 615, second power lines 621 to 625, a victim cell 670, and aggressor cells 681 to 684 and 691 to 694.

Theoretically, all the remaining cells of the integrated circuit 600 except for the victim cell 670 may increase a delay of the victim cell 670. However, an increase in a delay of the victim cell 670 due to cells far away from the victim cell 670 may be slight. Accordingly, an area is set where the aggressor cells 681 to 684 and 691 to 694 capable of potentially increasing the delay of the victim cell 670 are located. It is assumed that cells in the above-described area mutually affect a delay but the remaining cells except for the cell in the area do not affect delays of the cells in the area. Accordingly, as the area becomes larger, analysis accuracy may increase, but an analysis time may also increase.

In an embodiment, in FIG. 8, a VDD grid (illustrated by an alternate long and two short dashes line) may be set along the first power lines 611 to 615 and the second power lines 621 to 625. As in a power grid, the VDD grid may be set in a lattice shape. The VDD grid may include a plurality of VDD areas (shaded areas). A height of the VDD area may be set to two times an interval between adjacent ones of the first power lines 611 to 615, and a width of the VDD area may be set to two times an interval between adjacent ones of the second power lines 621 to 625. The center of the VDD area may be arranged at an intersection of the second power line (VDD) 623 and the first power line (VDD) 613. In an embodiment, the area of the VDD area may be smaller than the area of the resistance area described with reference to FIGS. 2 and 3, and the number of VDD areas may be determined according to the VDD grid.

Referring to FIG. 8, the victim cell 670 may perform a rise switching operation. Here, the rise switching operation is an operation where a cell generates an output signal (e.g., a signal rising from low to high) rising in response to an input signal, and a fall switching operation is an operation where a cell generates an output signal (e.g., a signal falling from high to low) falling in response to an input signal. The aggressor cells 681 to 684 may perform the same rise switching operation as the victim cell 670; in contrast, the aggressor cells 691 to 694 may perform the fall switching operation that is opposite to the rise switching operation of the victim cell 670. The victim cell 670 and the aggressor cells 681 to 684 that perform the rise switching operation may be supplied with most of a current from VDD, and the aggressor cells 691 to 694 that perform the fall switching operation may be supplied with most of a current from VSS. The aggressor cells 681 to 684 may more increase a rise delay of the victim cell 670 than the aggressor cells 691 to 694. FIG. 8 illustrates the case where the victim cell 670 performs the rise switching operation. Below, the case where the victim cell 670 performs the fall switching operation will be described.

Figure 9:
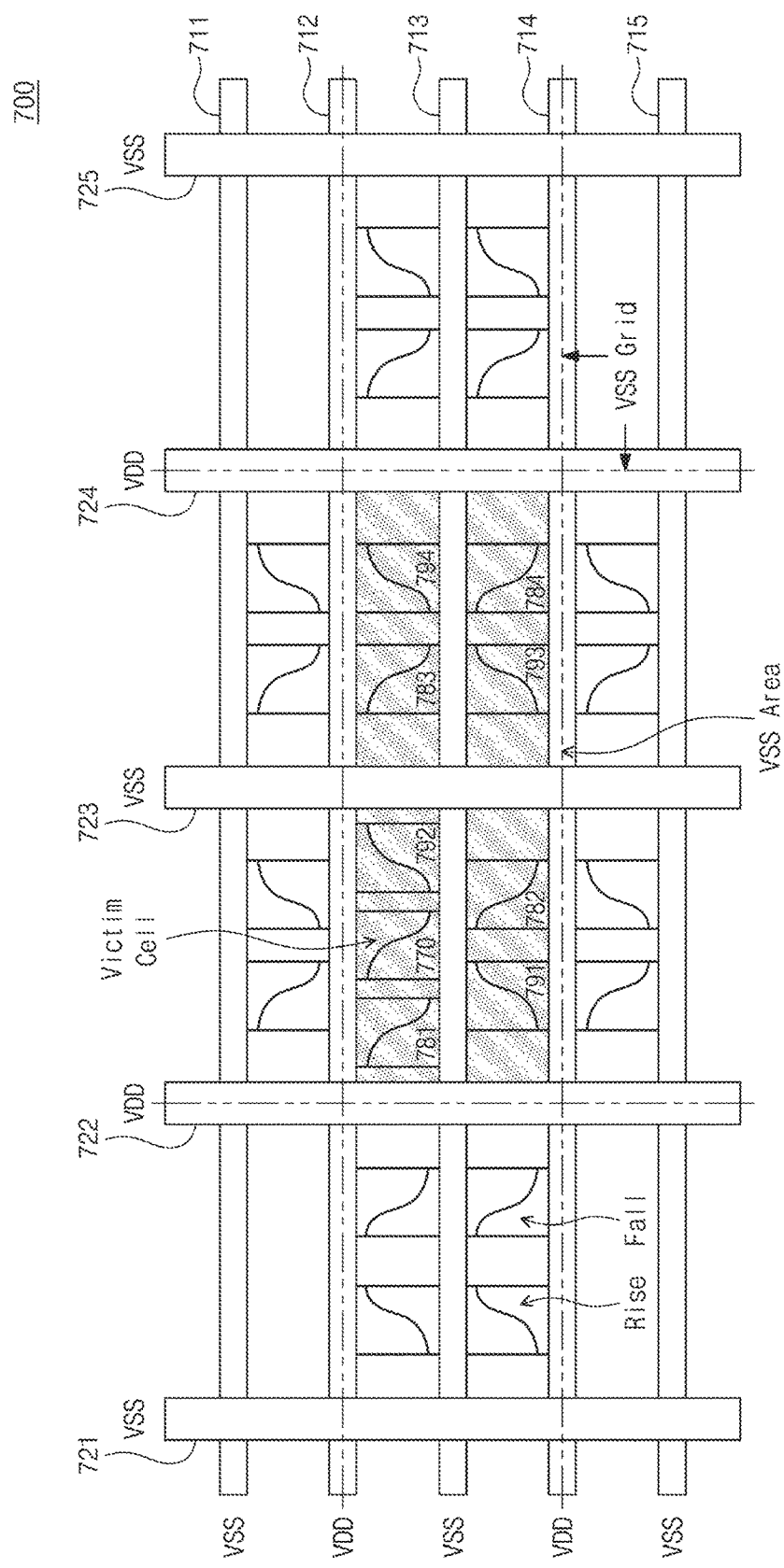
FIG. 9 is a view illustrating a voltage grid set according to an embodiment of the inventive concepts.

FIG. 9 is a view illustrating a voltage grid set according to an embodiment of the inventive concepts. Referring to FIG. 9, an integrated circuit 700 may include first power lines 711 to 715, second power lines 721 to 725, a victim cell 770, and aggressor cells 781 to 784 and 791 to 794.

A VSS grid of FIG. 9 may be set to be similar to that of FIG. 8. A VSS grid (illustrated by an alternate long and two short dashes line) may be set along the first power lines 711 to 715 and the second power lines 721 to 725. As in a power grid, the VSS grid may be set in a lattice shape. The VSS grid may include a plurality of VSS areas (shaded areas). A height of the VSS area may be set to two times an interval between adjacent ones of the first power lines 711 to 715, and a width of the VSS area may be set to two times an interval between adjacent ones of the second power lines 721 to 725. The center of the VSS area may be arranged at an intersection of the second power line (VSS) 723 and the first power line (VSS) 713. In an embodiment, the area of the VSS area may be smaller than the area of the resistance area described with reference to FIGS. 2 and 3, and the number of VSS areas may be determined according to the VSS grid.

Referring to FIG. 9, the victim cell 770 may perform a fall switching operation. The aggressor cells 781 to 784 may perform the same fall switching operation as the victim cell 770; in contrast, the aggressor cells 791 to 794 may be the rise switching operation that is opposite to the fall switching operation of the victim cell 770. Accordingly, the aggressor cells 781 to 784 may more increase a fall delay of the victim cell 770 than the aggressor cells 791 to 794.

Figure 10:
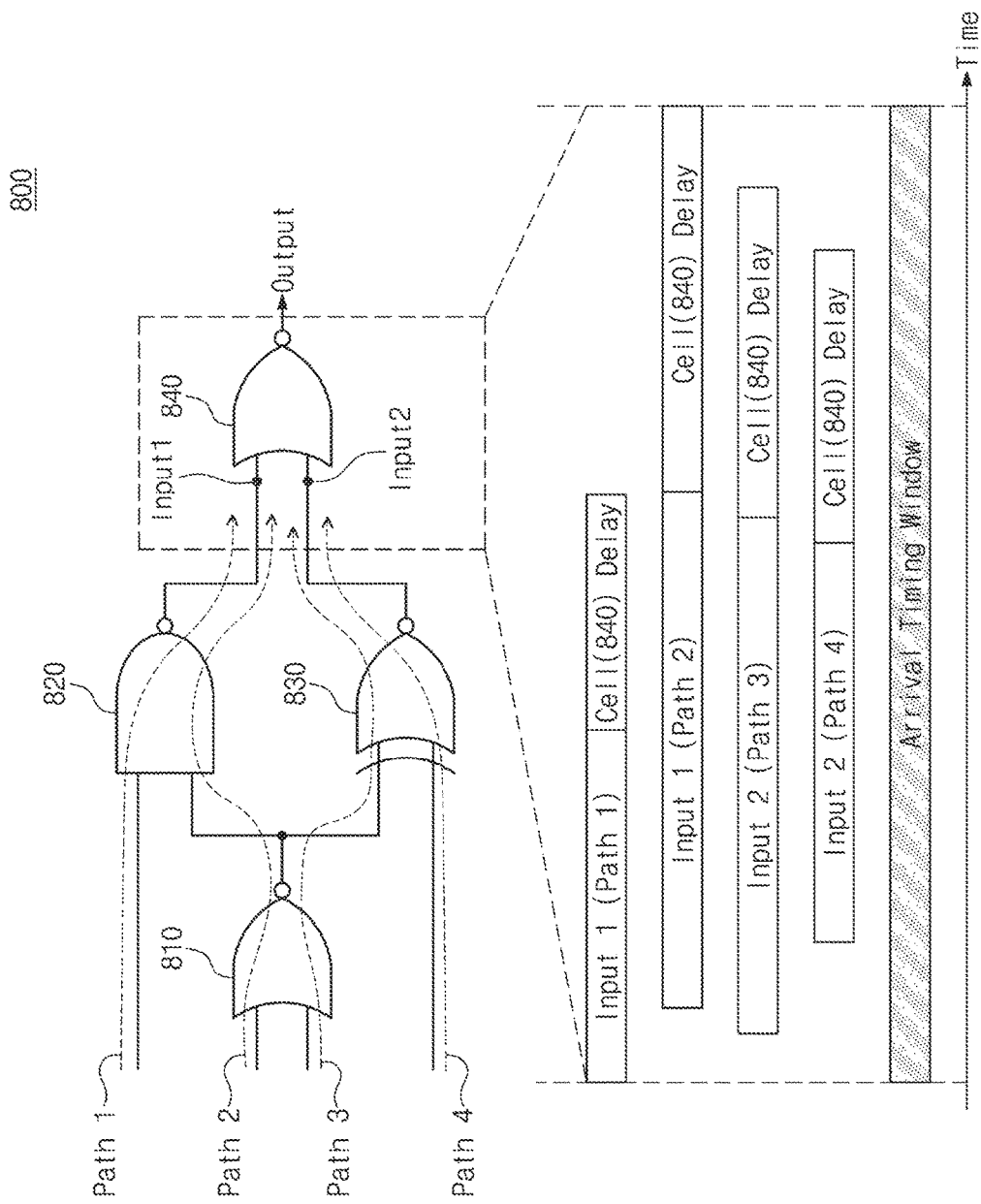
FIG. 10 is a view illustrating an arrival timing window of a victim cell illustrated in FIGS. 8 and 9.

FIG. 10 is a view illustrating an arrival timing window of a victim cell illustrated in FIGS. 8 and 9. Referring to FIG. 10, an integrated circuit 800 may include a plurality of cells 810 to 840. It is assumed that the cell 840 performing a NOR operation among the plurality of cells 810 to 840 is the above-described victim cell (the victim cell 670 of FIG. 8 and/or the victim cell 770 of FIG. 9).

An arrival timing window may mean a time difference between a time point when an input signal arrives most rapidly and a latest time point when an output signal is output. In FIG. 10, the victim cell 840 may receive input signals Input1 and Input2 through first to fourth paths Path1 to Path4. Windows of the input signals Input1 and Input2 that arrive at the victim cell 840 through a previous stage (i.e., the cells 810 to 830 or previous stages) may be various as illustrated in FIG. 10. Here, the windows of the input signals Input1 and Input2 may be calculated or determined by the static timing analysis (STA). In FIG. 10, windows (delays of the cell 840) generated by a delay (a time difference between the input signals Input1 to Input2 and an output signal Output) of the victim cell 840 itself are illustrated following windows of the input signals Input1 and Input2. The size of a window generated due to the delay of the victim cell 840 itself may be determined by the size of the victim cell 840, the size of a load cell, slopes of the input signals Input1 and Input2, a driving voltage, and/or the like. Accordingly, sizes of windows generated due to the delay of the victim cell 840 itself may be different from each other.

The arrival timing window of the victim cell 840 may include both windows of the input signals Input1 and Input2 and windows generated by the delay of the victim cell 840 itself. An aggressor cell performing a switching operation may be considered in the arrival timing window of the victim cell 840. Below, a method of calculating a timing derate of a victim cell due to an aggressor cell, where the arrival timing window of the aggressor cell overlaps with an arrival timing window of the victim cell, will be described.

Figure 11:
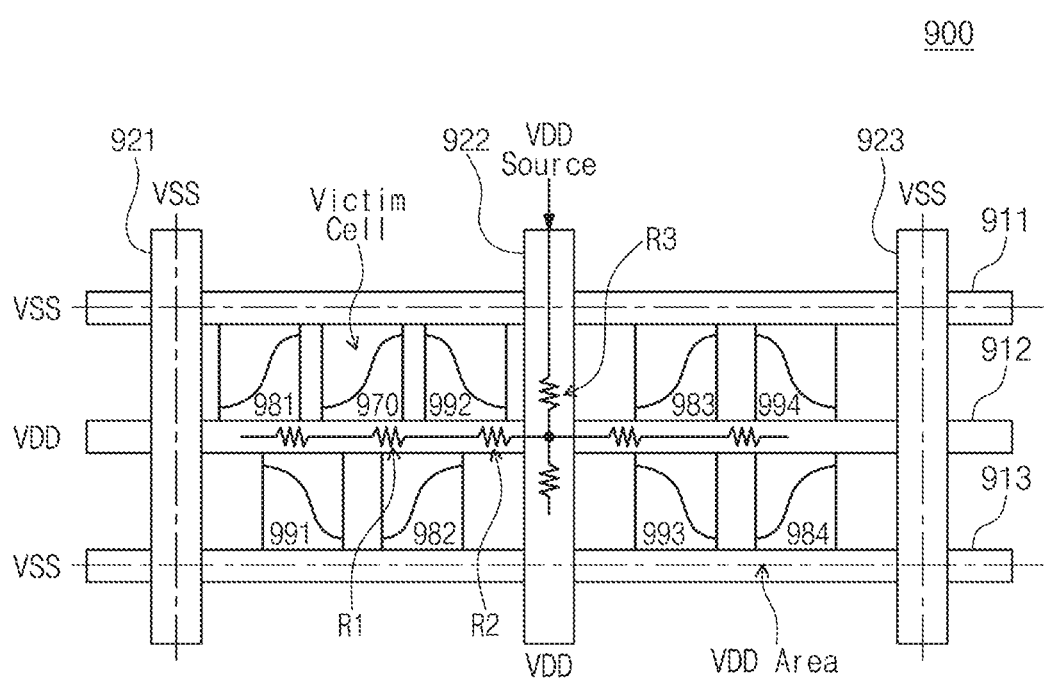
FIG. 11 is a view illustrating a voltage area illustrated in FIG. 8 in detail.
Figure 12:
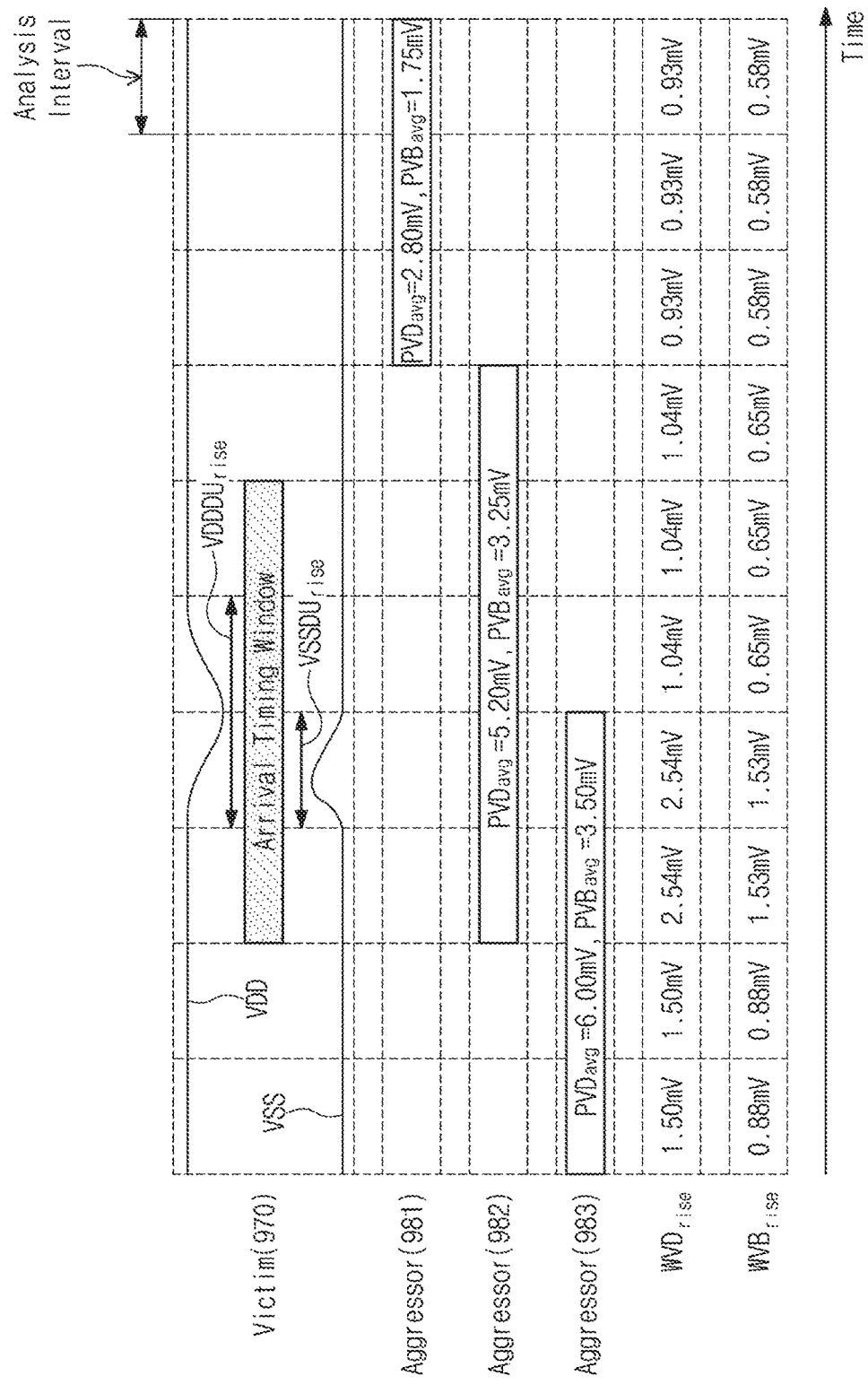
FIG. 12 is a view illustrating a weighted voltage variation according to an arrival timing window of a victim cell of FIG. 11 and an analysis interval.

FIG. 11 is a view illustrating a voltage area illustrated in FIG. 8 in detail. FIG. 12 is a view illustrating a weighted voltage variation according to an arrival timing window of a victim cell of FIG. 11 and an analysis interval. FIGS. 11 and 12 will be described together.

FIGS. 11 and 12 illustrate the case where a victim cell 970 performs a rise switching operation. Referring to FIG. 11, an integrated circuit 900 may include first power lines 911 to 913, second power lines 921 to 923, a victim cell 970, and aggressor cells 981 to 984 and 991 to 994. A VDD grid (illustrated by an alternate long and two short dashes line) and a VDD area may be set in the integrated circuit 900.

Referring to FIG. 12, arrival timing windows of the victim cell 970 and the aggressor cells 981 to 983 are illustrated. It is assumed that arrival timing windows of the remaining aggressor cells 984 and 991 to 994 do not overlap with the arrival timing window of the victim cell 970. The arrival timing windows of the victim cell 970 and the aggressor cells 981 to 983 may be divided by the analysis interval. For example, a ratio of the arrival timing window of the victim cell 970 to the analysis interval is four, a ratio of the arrival timing window of the aggressor cell 981 to the analysis interval is three, a ratio of the arrival timing window of the aggressor cell 982 to the analysis interval is five, and a ratio of the arrival timing window of the aggressor cell 983 to the analysis interval is four.

The analysis interval may be determined based on the voltage drop durations VDDDU50$_{rise}$ and VDDDU50$_{fall}$ and the voltage bounce durations VSSDU50$_{rise}$ and VSSDU50$_{fall}$ of the reference cell 451_6 described with reference to FIGS. 5 and 6. For example, the analysis interval may be set to half the minimal duration of the voltage drop durations VDDDU50$_{rise}$ and VDDDU50$_{fall}$ and the voltage bounce durations VSSDU50$_{rise}$ and VSSDU50$_{fall}$ of the reference cell 451_6. As the analysis interval become shorter, analysis accuracy may increase, but an analysis time may also increase.

An average peak voltage drop PVD$_{avg}$ and an average peak voltage bounce PVB$_{avg}$ of the aggressor cells 981 to 983 may be calculated by the following equations.

$$PVD_{avg} = \frac{PVD_{rise} + PVD_{fall}}{2} \quad \text{[Equation 11]}$$

$$PVB_{avg} = \frac{PVB_{rise} + PVB_{fall}}{2} \quad \text{[Equation 12]}$$

It is assumed that the power resistance R$_{VDD}$ of the aggressor cell 981 is 40Ω and the aggressor cell 981 corresponds to a BUF_X1 characteristic (e.g., cell size) in Table 1. Depending on Equation 3 and Equation 5, PVD$_{rise}$ of the aggressor cell 981 may be calculated to be 4 mV (=40Ω/50Ω×5 mV), and PVD$_{fall}$ may be calculated PVD$_{fall}$ to be 1.6 mV(=40Ω/50Ω×2 mV). Depending on Equation 11, PVD$_{avg}$ of the aggressor cell 981 may be calculated to be 2.8 mV (=(4 mV+1.6 mV)/2). As in the above description, PVB$_{rise}$ and PVB$_{fall}$ may be respectively calculated depending on Equation 4 and Equation 6, and PVB$_{avg}$ may also be calculated depending on Equation 12 (referring to Equation 12, PVB$_{avg}$ is 1.75 mV). As in the above description, in FIG. 12, PVD$_{avg}$ and PVB$_{avg}$ of the aggressor cell 982 may be respectively calculated to be 5.20 mV and 3.25 mV, and PVD$_{avg}$ and PVB$_{avg}$ of the aggressor cell 983 may be respectively calculated to be 6.00 mV and 3.50 mV.

After PVD$_{avg}$ and PVB$_{avg}$ of the aggressor cells 981 to 983 are calculated, a weighted voltage variation for the case where the victim cell 970 performs a rise switching operation in each analysis interval may be calculated. Here, the weighted voltage variation means a value corresponding to a sum of voltage variations due to the aggressor cells 981 to 983. The weighted voltage variation may include a rise weighted voltage drop WVD$_{rise}$ corresponding to a VDD drop and a rise weighted voltage bounce WVB$_{rise}$ corresponding to a VSS bounce. The rise weighted voltage drop WVD$_{rise}$ and the rise weighted voltage bounce WVB$_{rise}$ may be respectively calculated by the following equations.

$$WVD_{rise} = \sum_{n=1}^{N} \frac{PVD_{avg}(\text{aggressor } n)}{\left(\frac{\text{arrival timing window}}{\text{analysis interval}}\right)} \quad \text{[Equation 13]}$$

$$WVB_{rise} = \sum_{n=1}^{N} \frac{PVB_{avg}(\text{aggressor } n)}{\left(\frac{\text{arrival timing window}}{\text{analysis interval}}\right)} \quad \text{[Equation 14]}$$

A fall weighted voltage drop WVD$_{fall}$ and a fall weighted voltage bounce WVB$_{fall}$ for the case where the victim cell 970 performs a fall switching operation may be calculated in substantially the same manner as Equation 13 and Equation 14. Referring to Equation 13 and Equation 14, an arrival timing window is associated with an aggressor cell, and "N" indicates the number of aggressor cells overlapping with an arrival timing window of a victim cell in a voltage area. To digitize a voltage variation in each analysis interval, PVD$_{avg}$ and PVB$_{avg}$ may be divided by a ratio of an arrival timing window of an aggressor cell to an analysis interval.

For example, in the third analysis interval of FIG. 12, the rise weighted voltage drop WVD$_{rise}$ may be calculated to be 2.54 mV(=5.20 mV/5+6.00 mV/4) depending on Equation 13, and the rise weighted voltage bounce WVB$_{rise}$ may be calculated to be 1.53 mV (=3.25 mV/5+3.50 mV/4) depending on Equation 14. In the third analysis interval, since the arrival timing window of the aggressor cell 981 is not located, the voltage variation of the aggressor cell 981 is not considered (i.e., "N" is 2 in the third analysis interval and is "1" in the fifth analysis interval). In the remaining analysis intervals, the rise weighted voltage drop WVD$_{rise}$ and the rise weighted voltage bounce WVB$_{rise}$ may be respectively calculated in the above-described method.

After the rise weighted voltage drop WVD$_{rise}$ and the rise weighted voltage bounce WVB$_{rise}$ are calculated in each analysis interval, an effective voltage variation of the victim cell 970 due to aggressor cells may be calculated. The effective voltage variation may mean a value obtained by digitizing a voltage variation capable of occurring due to aggressor cells in the arrival timing window of the victim cell 970. The rise effective voltage variation may be calculated in consideration of the rise weighted voltage drop WVD$_{rise}$ and the rise weighted voltage bounce WVB$_{rise}$ calculated in each analysis interval, the power resistances R$_{VDD}$ and R$_{VSS}$ of the victim cell 970, and the voltage variation duration (the voltage drop duration and the voltage bounce duration described above). The rise effective voltage variation may include a rise effective voltage drop EVD$_{rise}$ and a rise effective voltage bounce EVB$_{rise}$.

First, the voltage drop duration VDDDU$_{rise}$ and the voltage bounce duration VSSDU$_{rise}$ of the victim cell 970 may be calculated by the following equations by using the voltage drop duration VDDDU50$_{rise}$ (5 ps, refer to Table 1) of a reference cell, the voltage bounce duration VSSDU50$_{rise}$ (2 ps, refer to Table 1) of the reference cell, the power resistances R$_{VDD}$ and R$_{VSS}$ of the reference cell, and the power resistances R$_{VDD}$ and R$_{VSS}$ of the victim cell 970.

$$VDDDU_{rise} = \frac{R_{VDD}}{50} \times VDDDU50_{rise} \quad \text{[Equation 15]}$$

$$VSSDU_{rise} = \frac{R_{VSS}}{50} \times VSSDU50_{rise} \quad \text{[Equation 16]}$$

In Equation 15 and Equation 16, each of the power resistance R$_{VDD}$ and the power resistance R$_{VSS}$ of the reference cell is 50Ω. Referring to FIG. 12, the voltage drop duration VDDDU$_{rise}$ and the voltage bounce duration VSS- DU$_{rise}$ in an arrival timing window of the victim cell 970 are illustrated. The voltage drop duration VDDDU$_{rise}$ of the victim cell 970 corresponds to two analysis intervals in the arrival timing window, and the voltage bounce duration VSSDU$_{rise}$ of the victim cell 970 corresponds to one analysis interval in the arrival timing window. However, the above-described numerical values are only examples.

The rise effective voltage drop EVD$_{rise}$ and the rise effective voltage bounce EVB$_{rise}$ may be respectively calculated by the following equations.

$$EVD_{rise} = \frac{(VDDDU_{rise})}{(\text{arrival timing window})} \times \text{Sum}(WVD_{rise} \text{ in arrival timing window})$$ [Equation 17]

$$EVB_{rise} = \frac{(VSSDU_{rise})}{(\text{arrival timing window})} \times \text{Sum}(WVB_{rise} \text{ in arrival timing window})$$ [Equation 18]

The rise effective voltage drop EVD$_{rise}$ and the rise effective voltage bounce EVB$_{rise}$ may be calculated by adding all the rise weighted voltage drops WVD$_{rise}$ and all the rise weighted voltage bounces WVB$_{rise}$ in the arrival timing window and adjusting the added result depending on a ratio of the voltage drop duration VDDDU$_{rise}$ and the voltage bounce duration VSSDU$_{rise}$ to the arrival timing window. A fall effective voltage drop EVD$_{fall}$ and a fall effective voltage bounce EVB$_{fall}$ for the case where the victim cell 970 performs a fall switching operation may be calculated in substantially the same manner as Equation 17 and Equation 18.

In an embodiment, the rise effective voltage drop EVD$_{rise}$ may be calculated to be 3.58 mV (=(2/4)*(2.54 mV+2.54 mV+1.04 mV+1.04 mV) depending on Equation 17, and the rise effective voltage bounce EVB$_{rise}$ may be calculated to be 1.09 mV (=(1/4)*(1.53 mV+1.53 mV+0.65 mV+0.65 mV) depending on Equation 18.

A rise timing derate TAIVD$_{rise}$ and a fall timing derate TAIVD$_{fall}$ of the victim cell 970 due to the aggressor cells 981 to 983 may be calculated by using the rise effective voltage drop EVD$_{rise}$ and the rise effective voltage bounce EVB$_{rise}$. However, a common resistance ratio of the aggressor cells 981 to 983 and the victim cell 970 may be considered in the above-described calculation process. Below, the common resistance ratio will be described with reference to FIG. 11.

Returning to FIG. 11, a resistance for a path from a VDD source to the cells 970, 981 to 984, and 991 to 994 is illustrated.

Referring to FIG. 11, all the cells 970, 981 to 984, and 991 to 994 in the VDD area are supplied with VDD from the VDD source through a common path. In this case, a common resistance of the common path may be "R3." The common resistance ratio CR is a ratio of the common resistance to a power resistance of a victim cell. In detail, in the case of FIG. 11, the common resistance ratio CR of the victim cell 970 may be R3/(R1+R2+R3).

A rise voltage variation AIVD$_{rise}$ and a fall voltage variation AIVD$_{fall}$ due to an aggressor cell may be calculated by the following equations by using the common resistance ratio CR, the rise effective voltage drop EVD$_{rise}$, the rise effective voltage bounce EVB$_{rise}$, the fall effective voltage drop EVD$_{fall}$, and the fall effective voltage bounce EVB$_{fall}$ described above.

$$AIVD_{rise} = (EVD_{rise} + EVB_{rise}) \times CR$$ [Equation 19]

$$AIVD_{fall} = (EVD_{fall} + EVB_{fall}) \times CR$$ [Equation 20]

That is, the rise effective voltage drop EVD$_{rise}$, the rise effective voltage bounce EVB$_{rise}$, the fall effective voltage drop EVD$_{fall}$, and the fall effective voltage bounce EVB$_{fall}$ may be reduced or adjusted according to the common resistance ratio CR. In the above description, the common resistance ratio CR has been applied to EVD$_{rise}$, EVB$_{rise}$, EVD$_{fall}$ and EVB$_{fall}$. However, in an embodiment, CR may be calculated for each individual aggressor. In this case, Equation 11 and Equation 12 can be modified to include multiplication by CR for the aggressor-specific PVD$_{avg}$ and PVB$_{avg}$ being computed. When multiplication by aggressor-specific CR is done in this way, multiplication by CR in Equation 19 and Equation 20 may be omitted. When computed in this way, the meaning of PVD$_{avg}$ and PVB$_{avg}$ may be thought of as the peak voltage drop/voltage bounce of the aggressor at the location of the victim cell.

The rise timing derate TAIVD$_{rise}$ and the fall timing derate TAIVD$_{fall}$ of a victim cell may be respectively calculated by the following equations by using the rise voltage variation AIVD$_{rise}$ and the fall voltage variation AIVD$_{fall}$ due to the aggressor cell, the rise voltage variation SIVD$_{rise}$ and the fall voltage variation SIVD$_{fall}$ of the victim cell due to the power resistances R$_{VDD}$ and R$_{VSS}$ of a cell, and the rise timing derate TSIVD$_{rise}$ and the fall timing derate TSIVD$_{fall}$ of the victim cell due to the power resistances R$_{VDD}$ and R$_{VSS}$ of the cell.

$$TAIVD_{rise} = \frac{AIVD_{rise}}{SIVD_{rise}} \times TSIVD_{rise}$$ [Equation 21]

$$TAIVD_{fall} = \frac{AIVD_{fall}}{SIVD_{fall}} \times TSIVD_{fall}$$ [Equation 22]

The rise timing derate TSIVD$_{rise}$ of the victim cell may be adjusted depending on a ratio of the rise voltage variation AIVD$_{rise}$ due to the aggressor cell to the rise voltage variation SIVD$_{rise}$ of the victim cell, and the fall timing derate TSIVD$_{fall}$ of the victim cell may be adjusted depending on a ratio of the fall voltage variation AIVD$_{fall}$ due to the aggressor cell to the fall voltage variation SIVD$_{fall}$ of the victim cell.

Depending on the following equations, a total rise timing derate TDVD$_{rise}$ of the victim cell may be calculated by adding the rise timing derate TSIVD$_{rise}$ of the victim cell due to the power resistances R$_{VDD}$ and R$_{VSS}$ of a cell and the rise timing derate TAIVD$_{rise}$ of the victim cell due to the aggressor cell(s), and a total fall timing derate TDVD$_{fall}$ of the victim cell may be calculated by adding the fall timing derate TSIVD$_{fall}$ of the victim cell due to the power resistances R$_{VDD}$ and R$_{VSS}$ of a cell and the fall timing derate TAIVD$_{fall}$ of the victim cell due to the aggressor cell(s).

$$TDVD_{rise} = TSIVD_{rise} + TAIVD_{rise}$$ [Equation 23]

$$TDVD_{fall} = TSIVD_{fall} + TAIVD_{fall}$$ [Equation 24]

A detailed calculation example of TDVD$_{rise}$ will be described with the following PVD$_{rise}$ (4 mV), PVB$_{rise}$ (0.4 mV), and TSIVD$_{rise}$ (+0.7%) values calculated with respect to the cell 550 in FIG. 7. The rise effective voltage drop EVD$_{rise}$ and the rise effective voltage bounce EVB$_{rise}$ are respectively calculated to be 3.58 mV and 1.09 mV, and it is assumed that the common resistance ratio CR is 0.8.

First, $SIVD_{rise}$ may be calculated to be 4.4 mV (=4 mV+0.4 mV) depending on Equation 9. Next, $AIVD_{rise}$ may be calculated to be 3.74 mV (=(3.58 mV+1.09 mV)33 0.8) depending on Equation 19. Depending on Equation 21, $TAIVD_{rise}$ may be calculated to be +0.59% (=(3.74 mV/4.4 mV)×(+0.7%)). Depending on Equation 23, $TDVD_{rise}$ may be calculated to be +1.29% (=0.7%+0.59%). According to an embodiment of the inventive concepts, the total rise timing derate $TDVD_{rise}$ and the total fall timing derate of $TDVD_{fall}$ the victim cell may be calculated in consideration of both the power resistances $R_{VDD}$ and $R_{VSS}$ of a cell and a delay of the victim cell due to an aggressor cell.

Figure 13:
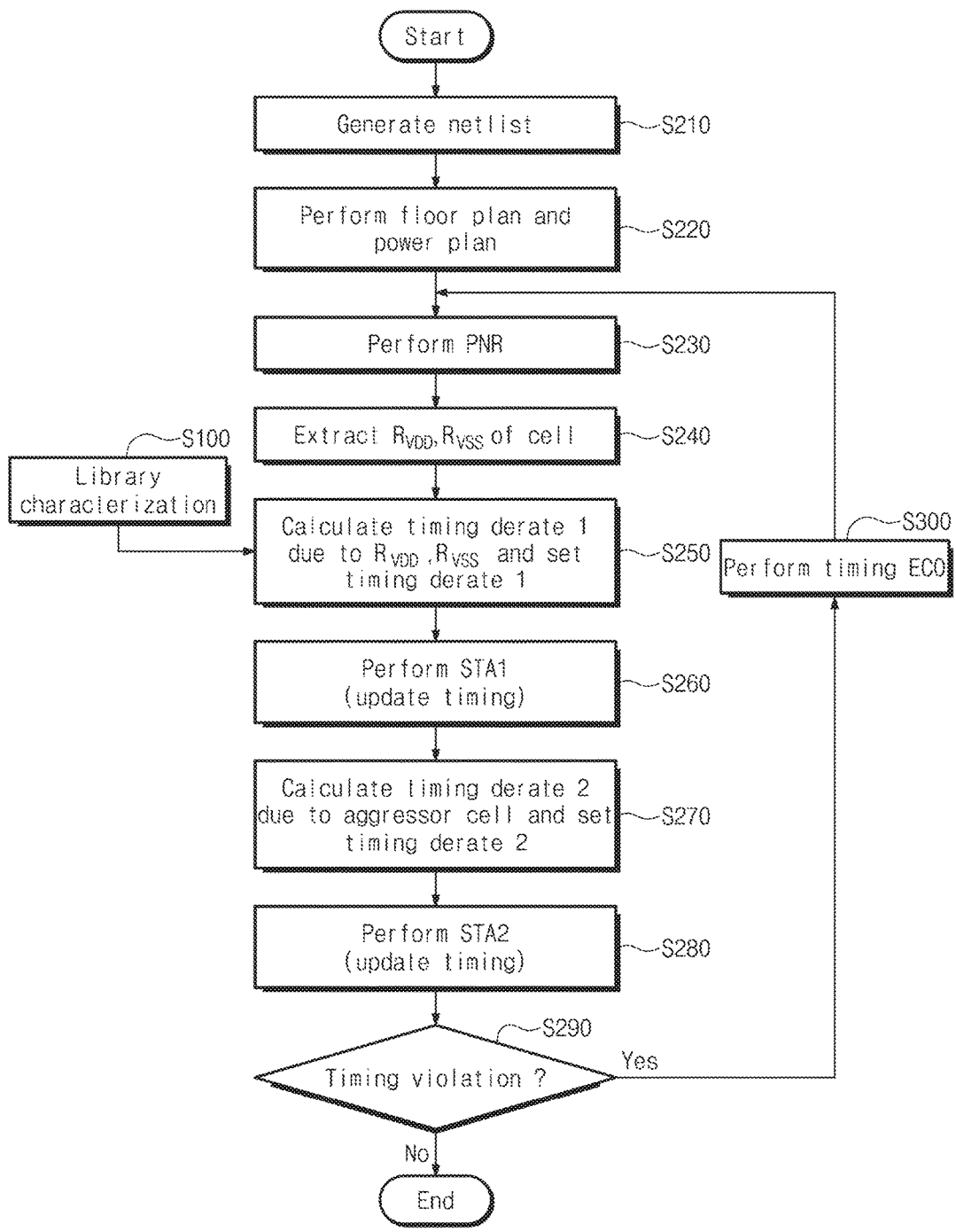
FIG. 13 is a flowchart illustrating a design method of an integrated circuit according to an embodiment of the inventive concepts.

FIG. 13 is a flowchart illustrating a design method of an integrated circuit according to an embodiment of the inventive concepts.

In operation S100, library characterization for a reference cell may be performed. The library characterization indicates the process of generating information of a reference cell for indicating a delay average of a plurality of cells in an integrated circuit and storing the generated information in a library (refer to Table 1 and Table 2). The information of the characterized reference cell stored in the library in operation S100 may be used in operation S250 to be described later. Operation S100 may be performed to be independent of operation S210 to operation S290 or operation S300, and may not be repeated. Operation S100 will be more fully described with reference to FIG. 14.

In operation S210, a gate-level netlist may be generated. In general, a design method of an integrated circuit may be roughly divided into a front end process and a back end process. Depending on a required specification, programming may be performed using a hardware description language (HDL) such as Verilog, VHDL, or the like, and synthesis may be then performed. A design compiler corresponding to the EDA program may be used for the synthesis. The gate-level netlist may be generated according to the synthesis. A design process where the gate-level netlist is obtained may be included in the front end process. Operation S220 to operation S300 may be included in the back end process.

In operation S220, a floor plan and a power plan may be performed. The floor plan may include schematic placement information of gates in an integrated circuit, and the power plan may include schematic routing information of a power grid for supplying power to the gates.

In operation S230, place and routing (PNR) may be performed. The netlist generated in operation S210 may indicate how gates (or cells) are connected in the integrated circuit. Accordingly, where to place the gates and how to route wires connecting the gates may be performed.

In operation S240, the power resistances $R_{VDD}$ and $R_{VSS}$ of a cell in the integrated circuit may be extracted. The power resistances $R_{VDD}$ and $R_{VSS}$ may include resistances determined by widths and lengths of power lines connected to the cell. The process of extracting the power resistances $R_{VDD}$ and $R_{VSS}$ will be described with reference to FIG. 15.

In operation S250, a first timing derate (refer to Equation 7 and Equation 8) indicating a delay of a cell occurring at a cell itself due to the power resistances $R_{VDD}$ and $R_{VSS}$ extracted in operation S240 may be calculated. The information (refer to Table 1 and Table 2) of the reference cell characterized in the library in operation S100 may be used in the process of calculating the first timing derate.

In operation S260, a first static timing analysis (STA1) may be performed on the integrated circuit. The first static timing analysis may indicate the process of calculating propagation delays of cells in the integrated circuit and determining arrival timing windows (refer to FIG. 10), by using the first timing derate indicating the delay of the cell occurring at the cell itself due to the power resistances $R_{VDD}$ and $R_{VSS}$. In an embodiment, operation S260 may include updating a timing of a general static timing analysis. For example, the static timing analysis may be a simulation method for calculating an expected timing of an integrated circuit (or a digital circuit) that operates based on a clock.

In operation S270, a second timing derate (refer to Equation 21 and Equation 22) indicating a delay of a victim cell generated by an aggressor cell may be calculated. The process of calculating the second timing derate will be described with reference to FIG. 17.

In operation S280, a second static timing analysis (STA2) may be performed on the integrated circuit. The second static timing analysis may indicate the process of calculating propagation delays of the respective cells in the integrated circuit, by using the first timing derate indicating the delay of the cell occurring at the cell itself due to the power resistances $R_{VDD}$ and $R_{VSS}$ and the second timing derate indicating the delay of the victim cell generated by the aggressor cell. In an embodiment, operation S280 may include updating the timing of the general static timing analysis.

In operation S290, whether a timing violation occurs may be determined with reference to the result of the second static timing analysis (STA2). For example, whether a setup timing violation or a hold timing violation of a flip-flop occurs may be determined. If the timing violation does not occur (No), the process of resolving timing violations ends, and after any additional necessary design steps (design rule checking, etc.), the integrated circuit may be manufactured. If the timing violation occurs (Yes), operation S300 is performed.

In operation S300, a timing engineering change order (ECO) process may be performed. To solve the timing violation detected in operation S290 through the timing ECO process, cells and power lines in the integrated circuit may be appropriately placed and routed. Also, in the timing ECO process, a cell size or location may be adjusted, a buffer may be inserted, or the lengths or widths of power lines in the integrated circuit may be adjusted. In an embodiment, through operation S100, operation S210 to operation S290, and operation S300, a plurality of cells and power lines in the integrated circuit may be placed and routed based on a propagation delay that includes the delay of the cell occurring at the cell itself due to the power resistances $R_{VDD}$ and $R_{VSS}$ and the delay of the (victim) cell due to aggressor cell(s).

After operation S300 is performed, operation S230 to operation S290 may be repeated. However, in the case where power lines in the integrated circuit are revised in operation S300, operation S240 is again performed; in the case where power lines in the integrated circuit are not revised in operation S300, operation S240 is not performed.

Figure 14:
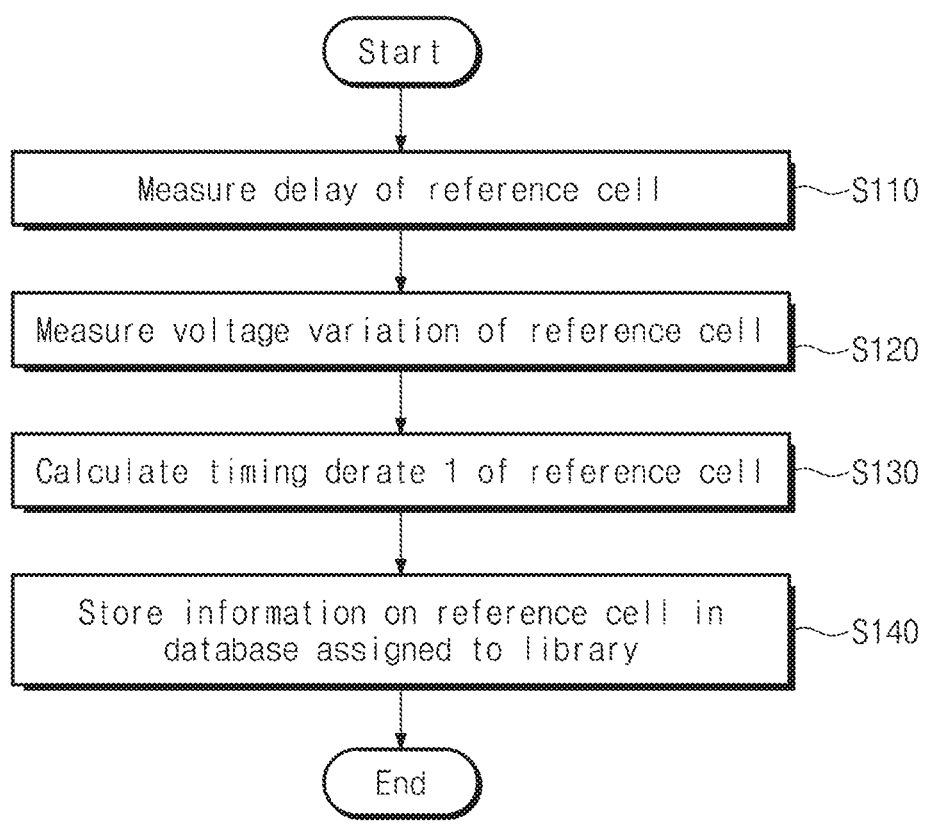
FIG. 14 is a flowchart illustrating a process corresponding to operation S100 of FIG. 13 in detail.

FIG. 14 is a flowchart illustrating the process corresponding to operation S100 of FIG. 13 in detail.

In operation S110, a delay of a reference cell may be measured. As described above, the reference cell is a cell for indicating a delay average of a plurality of cells in an integrated circuit (refer to FIG. 4). In an embodiment, a delay of the reference cell for the case where each of reference power resistances $R_{VDD}$ and $R_{VSS}$ of the reference cell is 50Ω and a delay of the reference cell for the case where each of reference power resistances $R_{VDD}$ and $R_{VSS}$ of the reference cell is 0Ω may be measured respectively.

In operation S120, a voltage variation of the reference cell may be measured. The voltage variation of the reference cell for the case where each of reference power resistances $R_{VDD}$ and $R_{VSS}$ of the reference cell is 50Ω may be measured. In an embodiment, operation S110 and operation S120 may be performed at the same time (refer to FIGS. 5 and 6).

In operation S130, the first timing derate may be calculated by using the delays of the reference cells measured in operation S110 (refer to Equation 1 and Equation 2). The first timing derate may indicate the degree of a delay of a cell due to the power resistances $R_{VDD}$ and $R_{VSS}$.

In operation S140, the information of the reference cell measured or calculated in operation S110 to operation S130 may be stored in a database allocated to a library. In detail, the information of the reference cell may be similar to that of the data of Table 1 and Table 2 described above. The library for the reference cell generated through operation S110 to operation S140 may be used to calculate a delay of each cell in an integrated circuit.

Figure 15:
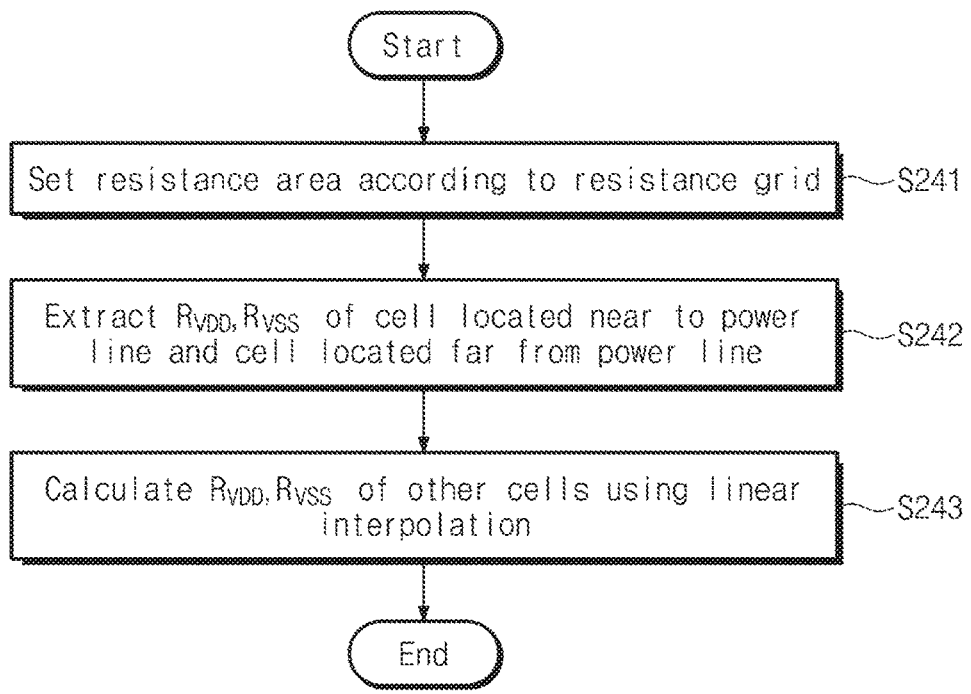
FIG. 15 is a flowchart illustrating a process corresponding to operation S240 of FIG. 13 in detail.

FIG. 15 is a flowchart illustrating the process corresponding to operation S240 of FIG. 13 in detail.

In operation S241, a resistance area may be set according to a resistance grid in an integrated circuit. Referring to FIGS. 2 and 3, the resistance grid may be set according to routing (i.e., a power grid) of power lines in the integrated circuit. The resistance area may be set as the resistance grid is set, and a plurality of cells in the integrated circuit may be classified by the set resistance area. As described above, the resistance area may be set within a range where a distribution of the power resistances $R_{VDD}$ and $R_{VSS}$ has linearity.

In operation S242, in each resistance area, the power resistances $R_{VDD}$ and $R_{VSS}$ of a cell adjacent to a power line and the power resistances $R_{VDD}$ and $R_{VSS}$ of a cell far away from the power line may be respectively extracted. The cell that is far away from the power line may include a cell arranged at an intermediate point of power lines.

In operation S243, in each resistance area, the power resistances $R_{VDD}$ and $R_{VSS}$ of cells may be calculated by linear interpolation that is based on the resistances extracted in operation S242. Instead of extracting the power resistances $R_{VDD}$ and $R_{VSS}$ of each of the plurality of cells, according to an embodiment of the inventive concepts, the power resistances $R_{VDD}$ and $R_{VSS}$ of cells may be calculated by the linear interpolation that uses the power resistances $R_{VDD}$ and $R_{VSS}$ of cells at two points extracted in the resistance area.

Figure 16:
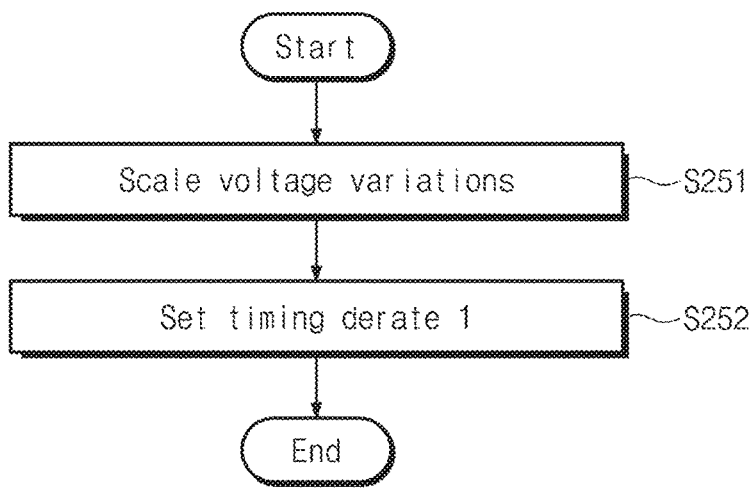
FIG. 16 is a flowchart illustrating a process corresponding to operation S250 of FIG. 13 in detail.

FIG. 16 is a flowchart illustrating the process corresponding to operation S250 of FIG. 13 in detail.

In operation S251, voltage variations $PVD_{rise}$, $PVB_{rise}$, $PVD_{fall}$, and $PVB_{fall}$ of a cell may be scaled according to a ratio of the power resistances $R_{VDD}$ and $R_{VSS}$ of the cell in an integrated circuit extracted in operation S240 to a power resistance (e.g., 50Ω) of a reference cell (refer to Equation 3 to Equation 6). Afterwards, a first timing derate (refer to Equation 7 and Equation 8) of any cell may be calculated.

In operation S252, the first timing derate of a cell may be set (set timing derate 1). Afterwards, the first timing derate of the cell thus set may be used in the static timing analysis of operation S260 illustrated in FIG. 13.

Figure 17:
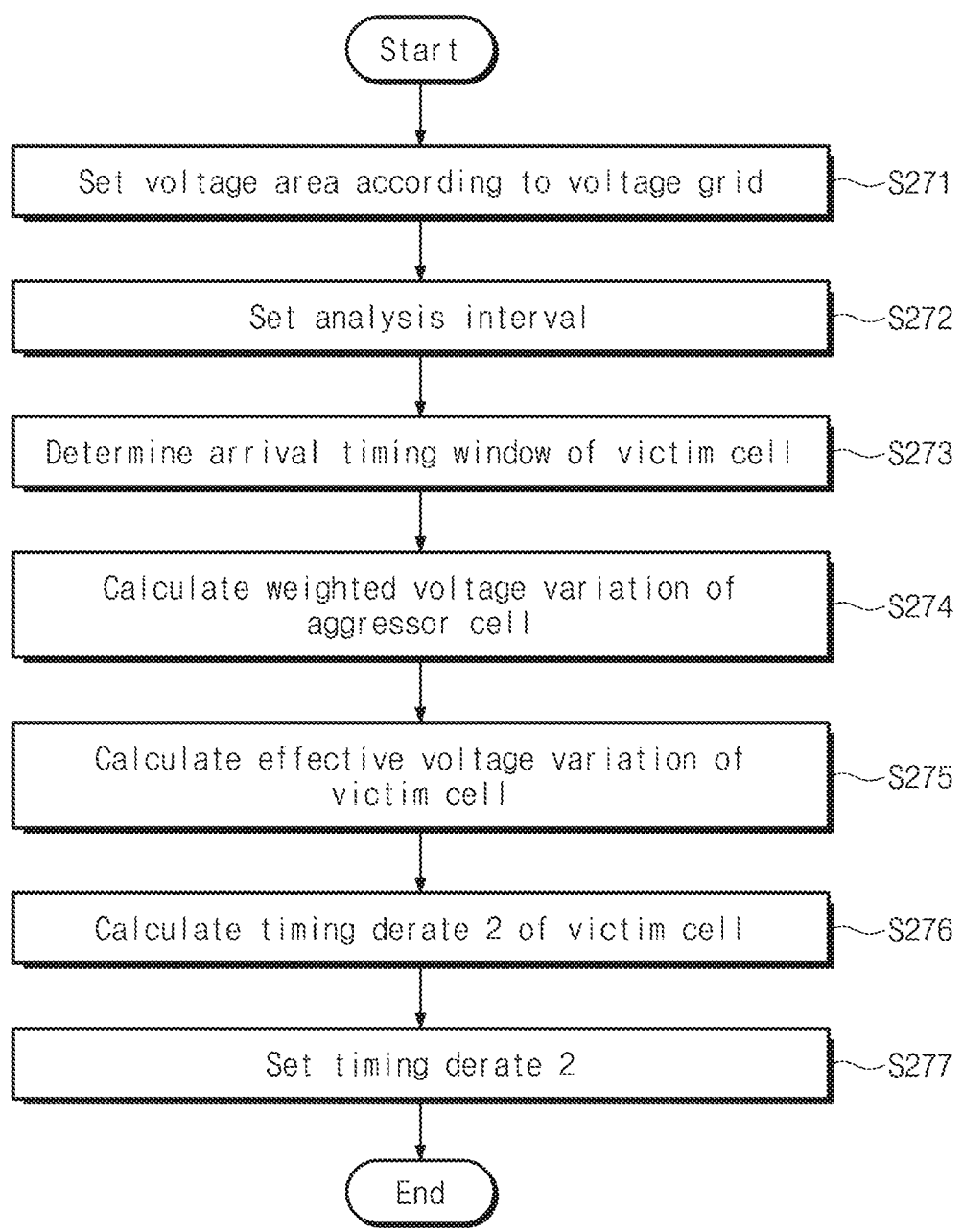
FIG. 17 is a flowchart illustrating a process corresponding to operation S270 of FIG. 13 in detail.

FIG. 17 is a flowchart illustrating the process corresponding to operation S270 of FIG. 13 in detail.

In operation S271, a voltage area may be set according to a voltage grid in an integrated circuit. Referring to FIGS. 8 and 9, the voltage grid may be set according to routing (i.e., a power grid) of power lines in the integrated circuit. A voltage area may be set as the voltage grid is set. If a cell in the voltage area is selected as a victim cell, all the remaining cells in the voltage area are aggressor cells.

In operation S272, an analysis interval (refer to FIG. 12) may be set. The analysis interval may be set to be shorter than a duration (e.g., a voltage drop duration and/or a voltage bounce duration) where a voltage variation of a reference cell occurs. In an embodiment, the analysis interval may be set to be shorter than a duration where the voltage variation of the reference cell occurs and durations where voltage variations of the remaining cells except for the reference cell occur.

In operation S273, an arrival timing window of the victim cell may be determined. The arrival timing window of the victim cell may be determined by using the result of the first static timing analysis (STA1) performed in operation S260.

In operation S274, a weighted voltage variation of an aggressor cell in each analysis interval may be calculated by using an average peak voltage drop and an average peak voltage bounce of the aggressor cell. In detail, a weighted voltage variation including a weighted voltage drop and a weighted voltage bounce illustrated in FIG. 12 may be calculated (refer to Equation 13 and Equation 14).

In operation S275, an effective voltage variation of the victim cell may be calculated by using the weighted voltage variation of the aggressor cell and a voltage variation duration of the victim cell in the arrival timing window (refer to Equation 17 and Equation 18).

In operation S276, a second timing derate of the victim cell may be calculated by using the effective voltage variation of the victim cell calculated in operation S275, a power resistance of the victim cell, and the first timing derate calculated in operation S250 (refer to Equation 23 and Equation 24).

In operation S277, the second timing derate of the victim cell may be set. Afterwards, the set second timing derate for the victim cell may be used in the static timing analysis of operation S280 illustrated in FIG. 13.

Figure 18:
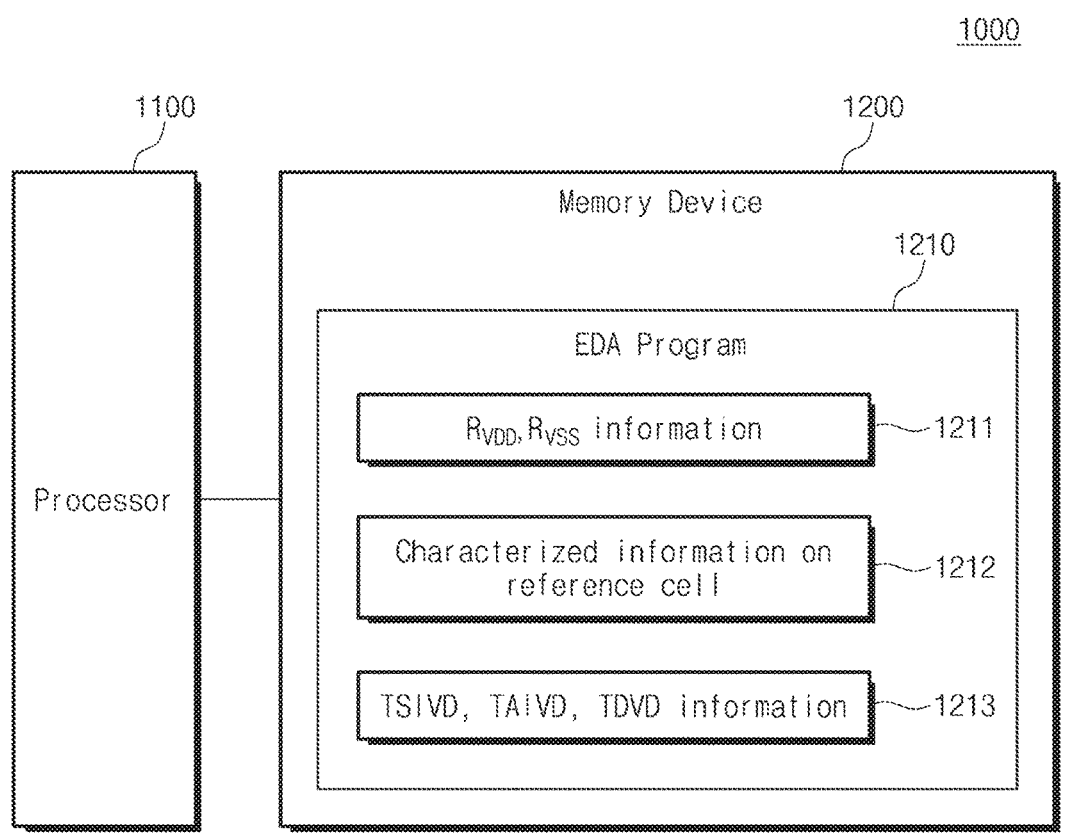
FIG. 18 is a block diagram illustrating a computing system for performing a design method of an integrated circuit according to an embodiment of the inventive concepts and an electronic design automation (EDA) program according to an embodiment of the inventive concepts.

FIG. 18 is a block diagram illustrating a computing system 1000 for performing a design method of an integrated circuit according to an embodiment of the inventive concepts and an EDA program 1210 according to an embodiment of the inventive concepts. The various operations of the design method of the integrated circuit described with reference to FIGS. 13 to 17 may be performed by any suitable means capable of performing the operations, such as various hardware and/or software component(s), circuits, and/or module(s). The software may comprise an ordered listing of executable instructions for implementing logical functions, and can be embodied in any "processor-readable medium" for use by or in connection with an instruction execution system, apparatus, or device, such as a single or multiple-core processor or processor-containing system.

Referring to FIG. 18, a computing system 1000 may include a processor 1100 and a memory device 1200. Here, the computing system 1000 may be referred to as a "computer" or an "electronic device".

The processor 1100 may be connected with the memory device 1200 and may provide the memory device 1200 with a command for writing data in the memory device 1200 and/or reading data from the memory device 1200. In an embodiment, the processor 1100 may include a central processing unit (CPU), a graphics processing unit (GPU), an application processor (AP), or the like.

The operations of the design method may be embodied directly in hardware, in a software module executed by the processor 1100, or in a combination of the two. If implemented in software, the operations (functions or instructions) may be stored on or transmitted over as one or more instructions or code on a tangible, non-transitory computer-readable medium. A software module may reside in a random access memory (RAM), a flash memory, a read only memory (ROM), an electrically programmable ROM (EPROM), and electrically erasable programmable ROM (EEPROM), registers, hard disk, a removable disk, a CD-ROM, or any other form of storage medium known in the art. For example, an EDA program 1210 according to an embodiment of the inventive concepts may be stored in the memory device 1200.

The processor 1100 may execute the EDA program 1210 stored in the memory device 1200 to perform all or some of the operations illustrated in FIGS. 13 to 17. In an embodiment, the static timing analysis corresponding to each of operation S260 and operation S280 may be executed together in conjunction with the EDA program 1210.

The processor 1100 may store information needed to execute the EDA program 1210 and/or information generated according to execution of the EDA program 1210 in the memory device 1200. The EDA program 1210 may store power resistance information ($R_{VDD}$, $R_{VSS}$ information) 1211 of each cell in the integrated circuit calculated in operation S240 of FIG. 13 and in operations S241 to S243 of FIG. 15 in the memory device 1200. The EDA program 1210 may store a library for the reference cell measured or calculated in Table 1 and Table 2 in the memory device 1200. The EDA program 1210 may store the calculation results of Equation 1 to Equation 24 described above in the memory device 1200 and may provide the calculation results to another EDA program or a user. In detail, the EDA program 1210 may store information (e.g., TSIVD, TAIVD, TDVD information) 1213 about a timing derate due to power resistance, a timing derate due to an aggressor cell, and/or a total timing derate in the memory device 1200.

The EDA program 1210 may set a resistance area or a voltage area based on routing of power lines. Accordingly, the EDA program 1210 may extract power resistances of cells in units of an area and may calculate the degree of delay due to power resistances and the degree of delay due to influence between cells, thereby reducing a run-time.

A design method of an integrated circuit according to an embodiment of the inventive concepts may perform a static timing analysis in consideration of power resistances of cells and influence between cells. Accordingly, whether a timing violation occurs in an integrated circuit may be more exactly determined. Because the static timing analysis portrays a more accurate view of the timing of the integrated circuit, integrated circuits that are manufactured according to embodiments described herein may have improved performance and greater reliability. That is to say that an integrated circuit that is manufactured using an improved model that incorporates more realistic impacts on the timing of the integrated circuit according to the inventive concepts described herein may have a different physical configuration and/or an improved and more reliable operation than an integrated circuit that is manufactured based on a conventional model.

An electronic design automation (EDA) program according to an embodiment of the inventive concepts may set a resistance area or a voltage area based on routing of power lines. Accordingly, the EDA program may extract power resistances of cells in units of an area and may calculate the degree of delay due to power resistances and the degree of delay due to influence between cells, thereby reducing a run-time.

While the inventive concepts have been described with reference to example embodiments thereof, it will be apparent to those of ordinary skill in the art that various changes and modifications may be made thereto without departing from the spirit and scope of the inventive concepts as set forth in the following claims.

What is claimed is:

1. An integrated circuit comprising:
   a plurality of cells; and
   a plurality of paths configured to supply power to the plurality of cells, respectively,
   wherein the plurality of cells and the plurality of paths are arranged based on a plurality of propagation delays of the plurality of cells,
   wherein the plurality of propagation delays comprise:
      a plurality of first delays of the plurality of cells generated by a plurality of power resistances of the plurality of paths; and
      a plurality of second delays of the plurality of cells generated based on a plurality of arrival timing windows that overlap each other.

2. The integrated circuit of claim 1, wherein each of the plurality of arrival timing windows indicates a time difference between a first time point when an input signal of each of the plurality of cells arrives and a second time point when an output signal of each of the plurality of cells is output.

3. The integrated circuit of claim 1, wherein the plurality of cells include a first cell and a second cell,
   wherein the plurality of paths include a first path for supplying power to the first cell and a second path for supplying power to the second cell, and
   wherein the plurality of power resistances are calculated by using linear interpolation that is based on a first power resistance of the first path and a second power resistance of the second path.

4. The integrated circuit of claim 1, wherein the plurality of first delays are calculated by using:
   a first reference delay of a reference cell of the plurality of cells, wherein the first reference delay of the reference cell is generated based on a reference power resistance of the plurality of power resistances of a path for supplying power to the reference cell;
   a second reference delay of the reference cell when the reference power resistance is zero; and
   the plurality of power resistances of the plurality of paths.

5. The integrated circuit of claim 1, wherein the plurality of cells comprises an aggressor cell and a victim cell, the victim cell having a first arrival timing window of the plurality of arrival timing windows that overlaps with a second arrival timing window of the plurality of arrival timing windows of the aggressor cell, and
   wherein the plurality of second delays are calculated based on a weighted voltage variation generated by a switching operation of the aggressor cell and an effective voltage variation of the victim cell according to the weighted voltage variation.

6. The integrated circuit of claim 5, wherein the effective voltage variation is adjusted according to a ratio of a first power resistance of a common path for supplying power to the victim cell and the aggressor cell to a second power resistance of a path for supplying power to the victim cell.

7. An integrated circuit comprising:
   a first cell of a plurality of cells; and
   a second cell of the plurality of cells,
   wherein a location of the first cell within the integrated circuit is arranged according to a plurality of propagation delays of the first cell, wherein the plurality of propagation delays comprise:
  a first delay of the first cell generated based on a plurality of power resistances of the first cell and a first switching operation of the first cell; and
  a second delay of the first cell generated based on a voltage variation due to a second switching operation of the second cell.

8. The integrated circuit of claim 7, wherein the first delay is calculated based on:
  a first reference delay of a reference cell of the plurality of cells that is generated based on a non-zero reference power resistance of a path for supplying power to the reference cell;
  a second reference delay of the reference cell that is generated based on an assumption that the reference power resistance is zero; and
  the plurality of power resistances of the first cell.

9. The integrated circuit of claim 8, wherein the first cell comprises a first arrival timing window that overlaps with a second arrival timing window of the second cell, and
  wherein the second delay is calculated based on a weighted voltage variation generated by the second switching operation of the second cell and an effective voltage variation of the first cell that is based on the weighted voltage variation.

10. The integrated circuit of claim 9, wherein the effective voltage variation is adjusted according to a ratio of a first power resistance of a common path for supplying power to the first cell and the second cell to a second power resistance of a path for supplying power to the first cell.

11. A method of integrated circuit design, comprising:
  extracting a plurality of power resistances of a plurality of paths for supplying power to a plurality of cells of an integrated circuit;
  calculating a plurality of first timing derates indicating a plurality of first delays of the plurality of cells generated by the plurality of power resistances;
  performing a first static timing analysis to calculate a plurality of propagation delays of the plurality of cells by using the plurality of first timing derates and to determine a plurality of arrival timing windows, in which the plurality of cells respectively receive input signals, by using the plurality of propagation delays;
  calculating a plurality of second timing derates indicating a plurality of second delays of the plurality of cells generated as the plurality of arrival timing windows overlap each other;
  performing a second static timing analysis to calculate the plurality of propagation delays by using the plurality of first timing derates and the plurality of second timing derates; and
  arranging the plurality of cells or the plurality of paths based on a result of the second static timing analysis.

12. The method of claim 11, wherein the extracting of the plurality of power resistances includes:
  setting a plurality of resistance areas for distinguishing the plurality of cells, depending on a resistance grid that is based on a routing of a plurality of power lines configuring the plurality of paths;
  extracting a first power resistance of a first path for supplying power to a first cell and a second power resistance of a second path for supplying power to a second cell placed in the same resistance area with the first cell, in each of the plurality of resistance areas; and
  calculating ones of the plurality of power resistances of paths for supplying power to cells which are placed in the same resistance area with the first and second cells by using linear interpolation based on the first power resistance and the second power resistance, in each of the plurality of resistance areas.

13. The method of claim 12, wherein the calculating of the plurality of first timing derates includes:
  calculating a first timing derate of a reference cell based on a difference between a delay of the reference cell generated by a reference power resistance of a path for supplying power to the reference cell and a delay of the reference cell for a case in which the reference power resistance is zero, wherein the reference cell is determined based on a number of delay stages of each of a plurality of delay chains in the integrated circuit and a fan-out of each of the plurality of cells; and
  calculating the plurality of first timing derates of the plurality of cells, by using the plurality of power resistances and the first timing derate of the reference cell.

14. The method of claim 13, wherein the calculating of the plurality of first timing derates of the plurality of cells includes:
  measuring a reference voltage variation and a reference voltage variation duration of the reference cell generated by the reference power resistance; and
  calculating a plurality of voltage variations and a plurality of voltage variation durations of the plurality of cells, by using the reference power resistance, the reference voltage variation, the reference voltage variation duration, and the plurality of power resistances.

15. The method of claim 14, wherein the calculating of the plurality of second timing derates includes:
  setting a plurality of voltage areas for distinguishing the plurality of cells, depending on a voltage grid that is based on the routing of the plurality of power lines;
  setting an analysis interval shorter than the plurality of voltage variation durations of the plurality of cells;
  calculating a weighted voltage variation of an aggressor cell, which is placed in each of the plurality of voltage areas, corresponding to the analysis interval;
  calculating an effective voltage variation of a victim cell, which is placed in each of the plurality of voltage areas and has a first arrival timing window overlapping with a second arrival timing window of the aggressor cell, by using the weighted voltage variation; and
  calculating a second timing derate of the victim cell, by using the effective voltage variation.

16. The method of claim 15, wherein the calculating of the plurality of voltage variations and the plurality of voltage variation durations of the plurality of cells includes:
  calculating a voltage variation of the aggressor cell, and
  wherein the calculating of the voltage variation of the aggressor cell includes:
  dividing the voltage variation of the aggressor cell by a ratio of the second arrival timing window of the aggressor cell to the analysis interval.

17. The method of claim 16, wherein the calculating of the plurality of voltage variations and the plurality of voltage variation durations of the plurality of cells further includes:
  calculating a voltage variation duration of the victim cell, and
  wherein the calculating of the effective voltage variation of the victim cell includes:
  adjusting the weighted voltage variation, depending on a ratio of the voltage variation duration of the victim cell to the first arrival timing window of the victim cell.

18. The method of claim 17, wherein the calculating of the second timing derate of the victim cell includes:

adjusting the effective voltage variation of the victim cell, depending on a ratio of a first power resistance of a common path for supplying power to the victim cell and the aggressor cell to a second power resistance of a path for supplying power to the victim cell.

19. The method of claim 18, wherein the calculating of the plurality of first timing derates of the plurality of cells further includes:

calculating a first timing derate of the victim cell, wherein the calculating of the plurality of voltage variations and the plurality of voltage variation durations of the plurality of cells further includes:

calculating a voltage variation of the victim cell, and wherein the calculating of the second timing derate of the victim cell includes:

calculating the first timing derate of the victim cell, depending on a ratio of the adjusted effective voltage variation for the voltage variation of the victim cell.

20. The method of claim 11, wherein the arranging of the plurality of cells or the plurality of paths includes:

determining whether a timing violation occurs, based on the plurality of propagation delays calculated by the second static timing analysis.

* * * * *